United States Patent [19]

Knight et al.

[11] 4,425,500

[45] * Jan. 10, 1984

[54] FIRING RANGE

[75] Inventors: Lindsay C. Knight, Albury, Australia; David A. Cash, Surrey, England; Duncan Stewart, Buckinghamshire, England; Robert A. Cottis, Berkshire, England; William H. Bowyer, Surrey, England; Robert C. Newnham, Berkshire, England; Frederick J. Williams, Bedfordshire, England; David W. Pardon, Hertfordshire, England

[73] Assignee: Australasian Training Aids (Pty.) Ltd., Albury, Australia

[*] Notice: The portion of the term of this patent subsequent to Jul. 28, 1998 has been disclaimed.

[21] Appl. No.: 286,279

[22] Filed: Jul. 23, 1981

Related U.S. Application Data

[63] Continuation of Ser. No. 51,218, Jun. 22, 1979, Pat. No. 4,281,241, which is a continuation of Ser. No. 879,458, Feb. 21, 1978, abandoned.

[30] Foreign Application Priority Data

Feb. 21, 1977 [GB] United Kingdom ................ 7253/77

[51] Int. Cl.³ .......................... F41J 5/12; G06F 15/20
[52] U.S. Cl. ................................... 235/400; 273/372; 364/423; 367/127; 367/906
[58] Field of Search ............... 364/400, 449, 460, 561, 364/565; 273/372; 367/127, 906; 235/400

[56] References Cited

U.S. PATENT DOCUMENTS

| 3,659,085 | 4/1972 | Potter | 364/460 X |
| 3,678,495 | 7/1972 | Gilbert | 273/372 |
| 3,707,699 | 12/1972 | Sanctuary | 273/372 |
| 3,723,960 | 3/1973 | Harris | 367/127 |
| 3,778,059 | 12/1973 | Rohrbaugh et al. | 273/372 |
| 3,881,096 | 4/1975 | Schmidt | 364/561 X |
| 3,985,024 | 10/1976 | Horak | 367/127 X |

FOREIGN PATENT DOCUMENTS

| 2738213 | 7/1978 | Fed. Rep. of Germany . |
| 591066 | 8/1977 | Switzerland . |
| 589835 | 11/1977 | Switzerland . |
| 1343694 | 1/1974 | United Kingdom . |
| 1371173 | 10/1974 | United Kingdom . |
| 1531224 | 11/1978 | United Kingdom | 364/565 |
| 1553251 | 9/1979 | United Kingdom | 367/127 |

OTHER PUBLICATIONS

Rachele: Sound Ranging Technique for Locating Supersonic Missiles, Journal, Acoustical Society of America, vol. 40, No. 5, 1966, pp. 950–954.

Primary Examiner—Felix D. Gruber
Attorney, Agent, or Firm—Schwartz, Jeffery, Schwaab, Mack, Blumenthal & Koch

[57] ABSTRACT

An apparatus for use in a firing range, in which transducers located adjacent the target area detect the airborne shock wave from supersonic projectiles. The position at which each projectile passes through the target plane is determined from the relative time of arrival of the associated shock wave at the transducers. A visual display of the target and the projectile position is provided for the use of range personnel.

25 Claims, 24 Drawing Figures

FIG. 17

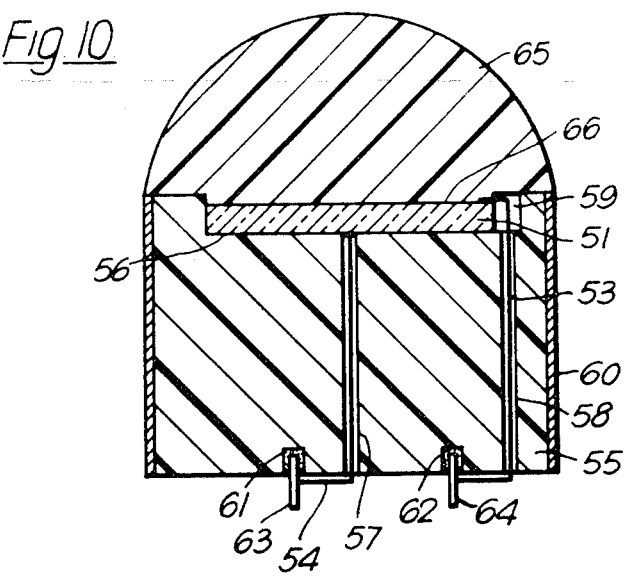
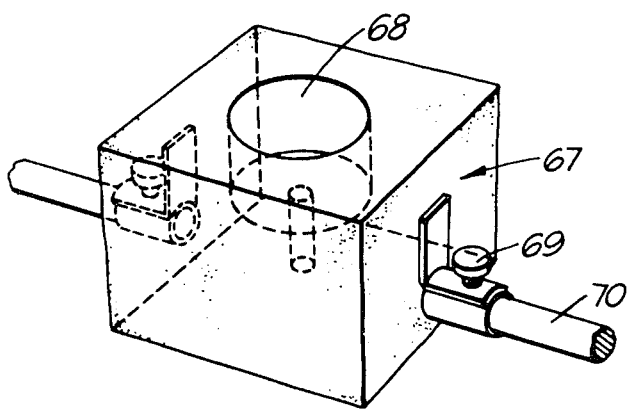

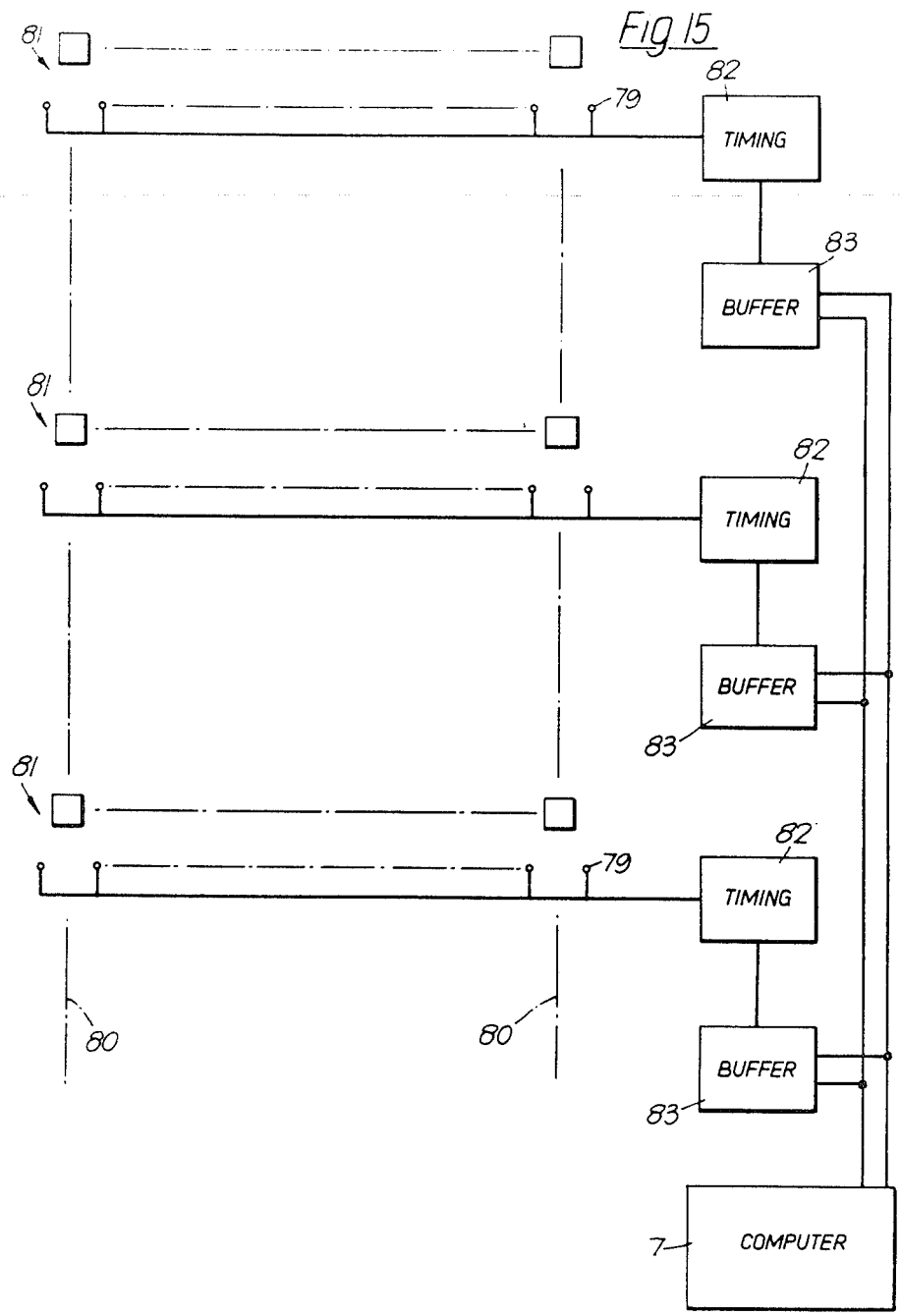

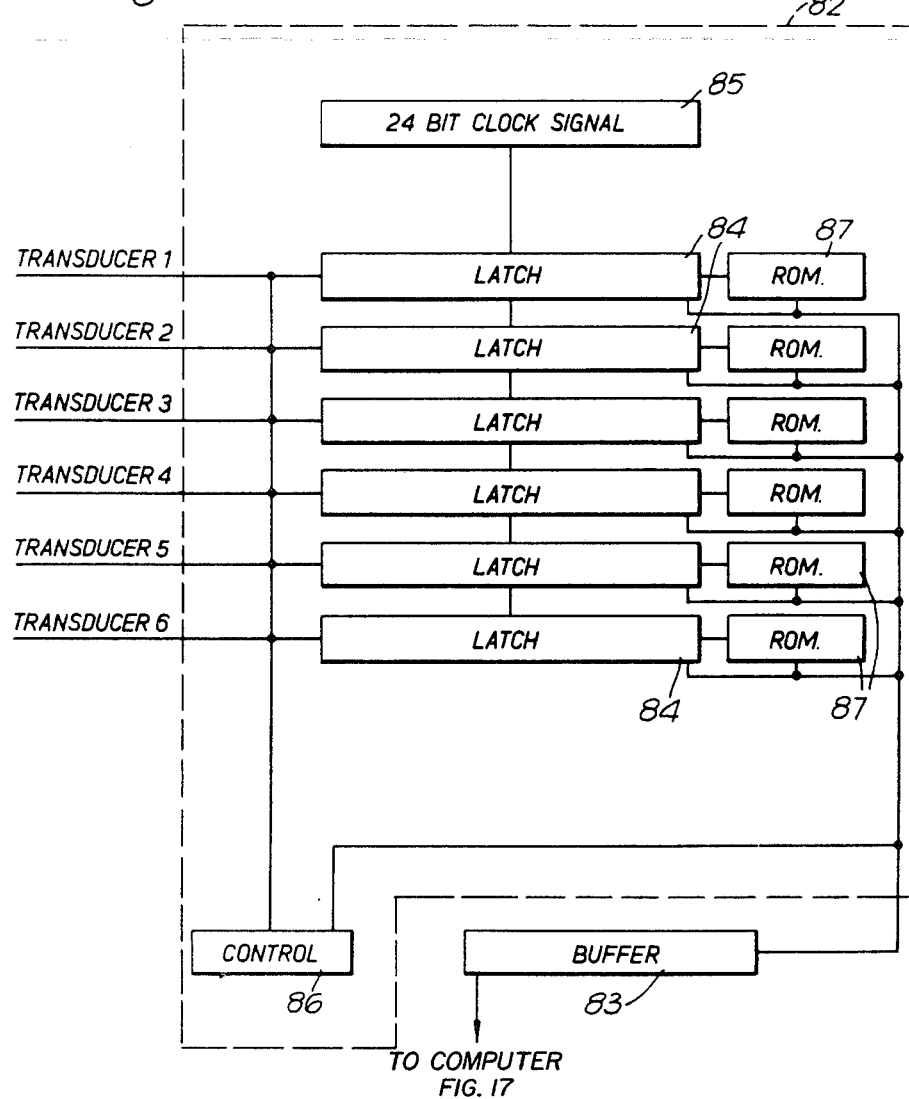

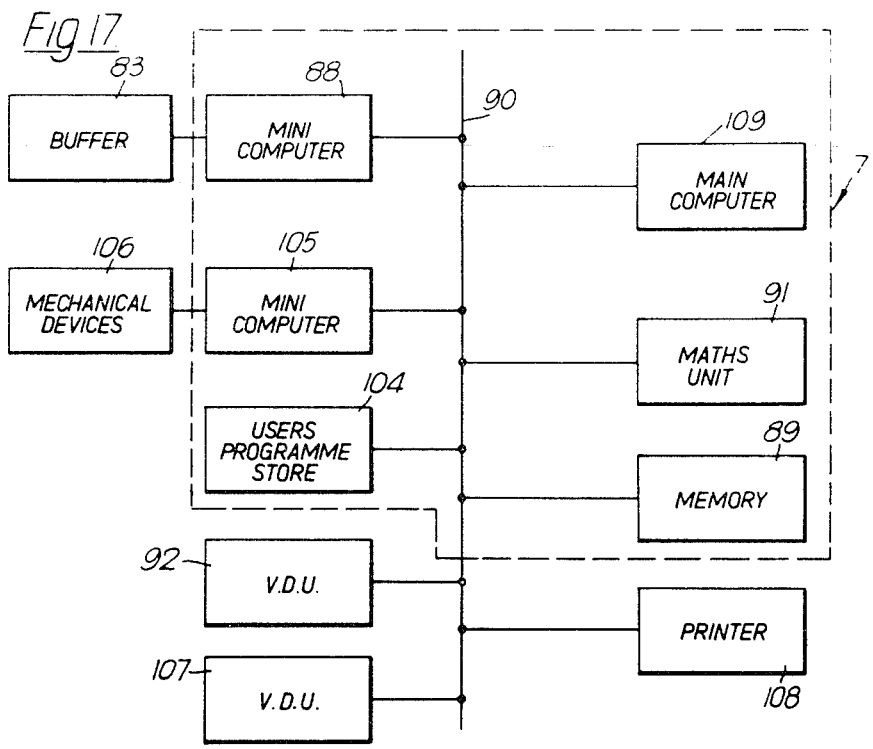
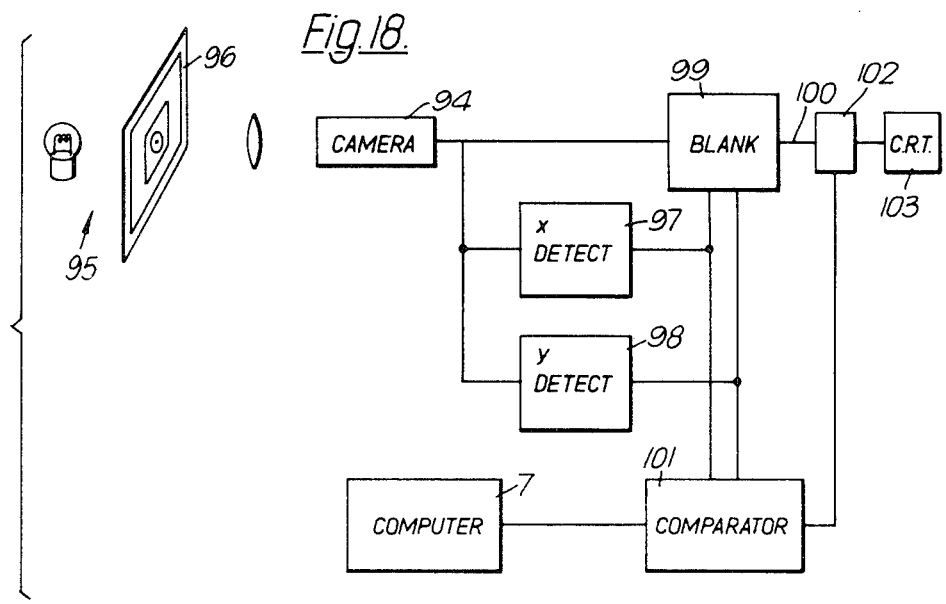

FIRING RANGE

This is a continuation, of application Ser. No. 051,218, now U.S. Pat. No. 4,281,241 filed June 22, 1979, which is a continuation of Ser. No. 879,458 filed Feb. 21, 1978, now abandoned.

BACKGROUND OF THE INVENTION

1. Field of the Invention

The present invention relates to a firing range and more particularly the present invention retains to a firing range for use in training of personnel in marksmanship.

2. The Prior Art

At the present time, when personnel are trained in firing a weapon such as a rifle it is common to utilise a static firing range in which the personnel fire their weapons at targets which are remote from the firing point, the position that each round impinges on the target being indicated by further personnel acting as markers who are located adjacent the targets but protected by an earth bank or the like.

This arrangement suffers from the disadvantage that for every trainee marksman there must be a person to act as a marker, and furthermore a rigid target must be utilised which must be repaired after each shooting session so that the point of impact of further rounds on the target can readily be determined.

A further disadvantage of this prior arrangement is that the sport of shooting is not appealing as a spectator sport since spectators cannot readily see how the shooting is progressing.

Yet a further disadvantage of the prior proposed arrangement is that personnel training the trainee marksman find it difficult to monitor the progress of a large number of trainee marksman and have to inspect the targets by means of a telescope or binoculars in order to assess how a trainee marksman is performing. This procedure is time-consuming and inconvenient.

Various attempts have been made to overcome these disadvantages.

Several proposals have been made in which transducers or similar shock wave detectors are connected directly to a rigid target or a rigid member located behind the target, the detectors being adapted to detect shock waves or vibrations generated in the target or member by the impact of a bullet on the target. The signals from the detectors are fed to a calculating device which calculates the position of the bullet or other projectile, and which causes that position to be displayed or stored. Specifications that disclose the systems of this general type are U.S. Patent Specification No. 2,973,964 (Zito) and U.S. Patent Specification No. 3,078,495 (Gilbert). Both these particular systems suffer from the disadvantage that a rigid target or member must be used, and the rigid target or member must be replaced after a certain period of use, since otherwise the target or member will be perforated by bullets fired at the target and then the target or member will not satisfactorily transmit the shock waves or vibrations generated when a bullet impinges on the target. Also, if a rigid target is used, with very accurate marksmen a hole will soon be generated in the region of the "bull" of the target, this hole having a diameter greater than the diameter of the bullets being fired at the target. Thus after a period of time a bullet may pass through this hole without generating shock waves, and a shot that should be recorded as a "bull" will be recorded as a "miss". Furthermore since the transducers are spaced around the periphery of the target or member the transducers may themselves be hit by bullets fired at the target, and thus the transducers may be damaged. Thus these systems suffer from the disadvantage of expense in that both the targets or rigid members and the transducers will have to be replaced at frequent intervals.

Various alternative proposals have been made in which transducers or the like are utilised to detect an air-carried shock wave generated by a bullet or projectile which travels at a speed faster than the speed of sound in air. Such a projectile can be called a supersonic projectile. One very simple proposal of this type is disclosed in U.S. Specification No. 2,783,047 (Faxon) in which a single shock wave sensitive device is operated to generate a signal in response to a shock wave generated by a supersonic projectile such as bullet and impinging on the device. The shock wave sensitive device is mounted in a target area zone bounded by a wall so that the device will be responsive to shock wave impulses produced by bullets entering the target area but not those produced by projectiles which pass outside the target area. It will be appreciated, therefore, that this particular arrangement will only be able to distinguish between a "hit" and a "miss" and will not be able to provide any accurate information concerning the precise position at which a bullet impinged upon the target area. A further proposal in which airborne acoustic shock waves produced by a supersonic projectile such as a bullet are utilised is described in U.S. Patent Specification No. 3,778,059 (Rohrbaugh) and in this Specification two metal rods are located respectively adjacent the base and one side edge of the target, there being acoustic transducers attached to the ends of the rods. When a bullet is fired at the target the shock wave generated by the bullet will impinge on the rods, and a resultant acoustic wave generated by the rods will be transmitted to the transducers which subsequently produces an electric signal. The resultant signals are fed to a timing and calculating device which calculates the position of the trajectory of the bullet and permits the position at which the bullet hits the target to be displayed on a device such as a cathode ray tube.

A further proposed arrangement is described in U.S. Specification No. 3,489,413 (Groder) and this Specification discloses the use of bi-directional transducers each adapted to detect whether a shock wave generated by a supersonic projectile and impinging on the transducer originates from the left or right of the central axis of the transducer. The specification describes an arrangement in which a plurality of transducers is arranged in a row adjacent the base of the target, and a further plurality of transducers is arranged in a column adjacent the side of the target. In view of the nature of the system it is only possible to determine which broad area of the target was impinged upon by any particular bullet since it will only be possible to determine the position of the bullet by reference to the two transducers at the base of the target between which the bullet passed and the corresponding two transducers at the side of the target. Thus the system only has very limited accuracy and furthermore the transducers provided at the side of the target are susceptible to damage by inaccurate firing.

A further prior proposal is disclosed in U.S. Specification No. 2,925,582 (Mattei) and this Specification discloses the use of four transducers spaced around the periphery of a target area, signals derived by the four transducers when a bullet is fired at the target being fed to an appropriate calculating and display device adapted to calculate and display the position of the bullet. The calculating device initially determines the duration of the shock wave detected by each transducer, since the duration of the shock wave increases with increasing distance from the origin of the shock waves. Signals representative of the durations of the shock wave control the beam scanning circuits of a display device. This prior proposed arrangement suffers from the disadvantage that at least three of the transducers are exposed to fire from the marksmen and are thus susceptible to damage. Furthermore, the levels of accuracy obtainable with the system described in this U.S. Specification are not very high.

It will be appreciated that the prior art discussed above discloses the general use of transducers to detect shock waves present in a rigid target or to detect airborne shock waves generated by a projectile such as a bullet, but all the prior proposed arrangements suffer from either the disadvantage that the arrangement does not provide an accurate indication of the precise position of the bullet, or the disadvantage that the transducers are in a position in which they may be damaged by bullets hitting the transducers. Furthermore, some of the prior proposals suffer from the disadvantage that rigid targets must be provided which must be replaced regularly to ensure that shock waves are transmitted satisfactorily through the rigid targets.

SUMMARY OF THE INVENTION

The present invention seeks to provide an improved target in which the above described disadvantages are obviated or reduced.

According to one aspect of this invention there is provided an apparatus for determining information concerning the trajectory of a supersonic projectile passing through a predetermined area, the apparatus comprising at least three transducers to be located spaced adjacent an edge of the predetermined area, each of the transducers comprising means for providing an output signal in response to an airborne shock wave impinging on the transducer and generated by the supersonic projectile, means for measuring the time delays between the output signals generated by said transducers in response to said shock wave, and means for calculating from the time delays, the information concerning the trajectory of the projectile.

In this specification the word "transducer" is used to mean a device capable of providing an output signal in response to detection of a shock wave generated by a supersonic projectile.

Preferably, the transducers are located adjacent the lower side edge of the predetermined area, and conveniently the transducers are each adapted to be mounted so that the shock wave impinges directly on the transducer.

Preferably, each transducer may comprise a disc shaped member of a piezo-electric material and each disc preferably has a diameter of approximately 5 mm.

In one arrangement the plane of each disc shaped member is substantially vertical, but the plane of each disc may be horizontal or may be inclined.

Advantageously each transducer comprises a member of rigid material for transmitting said airborne shock wave to a piezo-electric material element in firm contact with the base of the said member, said member having a convex surface exposed to the shock wave. Preferably said member is hemi-spherical.

Conveniently said transducer comprises a member of an insulating material having a recess to accommodate a disc of piezo-electric material having conductive coatings on the two opposed faces thereof and channels accommodating conductive wires connected to said coatings, the base of said member of rigid material being secured to the piezo-electric disc.

Preferably the member of insulating material is surrounded by a sleeve of an electrically conducting material to act as a Faraday Cage.

Advantageously such transducer is mounted on a rigid structure, the transducer being mounted in an appropriately shaped block of acoustic de-coupling material, the block being clamped or otherwise secured to the rigid structure. Preferably said acoustic de-coupling material comprises closed cell polyethylene foam.

The predetermined area may be a target area which may be provided with one or more targets. The information calculated may be the position of the trajectory relative to the target area.

In an alternative embodiment of the invention the transducers may be mounted in apertures formed at predetermined locations in a support panel, the transducers being dimensioned to be snugly engaged in said apertures, the panel being provided with means for absorbing shock waves. The panel may comprise a sheet of metal with sheets of sound absorbing material secured to the faces thereof.

Preferably means for absorbing shock waves or sound may be located between a rigid target in said target area and said transducers.

Means may be provided for amplifying the signal produced by each transducer, and such amplifying means may comprise initial amplifying means and a threshold comparator which only passes signals having a predetermined minimum value. The output of the threshold comparator may be amplified with a linear amplifier, and the threshold comparator may be adjustable. Four, five, six, seven, eight or nine transducers may be provided.

In one arrangement in accordance with the invention a plurality of target areas are located adjacent one another, and there is one array of transducers located under the target areas, the calculating means being adapted to select signals from the transducers providing an output signal in response to detection of a shock wave generated by a supersonic projectile fired at one of said target areas. The said array may be a linear row of transducers or may be two staggered rows of transducers.

Preferably means are provided for storing temporarily information concerning the time of generation of a signal by each transducer, and means are provided for subsequently transferring the information to a computer constituting the calculating means.

The storing means may comprise counters which are started and stopped in response to the detection of a shock wave by predetermined transducers, the counts stored in the counter subsequently being transferred to the computer. Alternatively, a clock signal generator may be provided to provide successive signals representative of successive instants of time, latches being provided adapted to store the signal generated by the clock signal generator at the instant that the latch receives a signal from an associated transducer; means may also be provided to supply a signal indicative of each latch, and to transfer signals from each latch and the means providing a signal indicative of that latch to a buffer. Further means may be provided for transferring signals from the buffer to a computer memory when the memory is able to accept the information.

A plurality of groups of transducers may be provided, each group being associated with one of said storing means. Each group of transducers may be associated with one bank of targets.

Preferably said computer comprises means for scanning information signals fed to the computer to select groups of signals likely to be derived from a single shock wave, and means for calculating the position of a projectile from each of said groups of signals. The calculating means may comprise a pre-programmed general-purpose device. The computer may be adapted to control the display of information on a visual display unit, and a television camera may be provided to generate a display signal from a visual image of a target. Means may be provided for detecting when a portion of the target image corresponding to the calculated position of a projectile is being displayed, and for inverting or otherwise modifying the display signal at that instant.

Preferably means are provided for determining the co-ordinates of the point of the visual image being scanned by the television camera at any instant, and for comparing these co-ordinates with the co-ordinates of the position of the projectiles as calculated by the computer.

The computer may also be proved with means for printing output data or punching paper with output data.

In one embodiment of the invention the transducers are all located adjacent a lower edge of a target area and are concealed from the firing point by means which cannot be penetrated by said projectiles.

A rigid target may be provided in said target area and each target may be provided with means to move the target from a concealed position to a visible position and vice versa. Also means may be provided for illuminating the target provided at said target area to permit shooting to be conducted after dark.

The transducers and rigid target may be mounted on a trolley which can move along a predetermined track to permit the position of the target to be adjusted.

A computer may be provided adapted to control and monitor movements of the targets. If a plurality of targets are provided, the computer may be provided with means for displaying the condition of each target. Alternatively, radio control means are provided to control movement of the target.

According to another aspect of this invention there is provided a transducer for detecting an airborne shock wave, the transducer comprising a dome member of substantially rigid material and having a convex surface adapted to be exposed to the shock wave, the dome member transmitting the shock wave to an element which provides an output signal in response to ths shock wave, the element being connected to the base of the dome.

Preferably the dome member is hemi-spherical.

Conveniently the element adapted to provide said output signal comprises a disc shaped member of piezo-electric material, one planar face of which is connected to the base of the dome member.

In one embodiment the disc is bonded into a recess formed in a housing formed of insulating material, the base of the dome being provided with a projection dimensioned to project into said recess and engage the disc of piezo-electric material.

Conveniently opposed planar faces of said disc are coated with an electrically conductive material, and electrically conductive wires are connected to the coated faces.

BRIEF DESCRIPTION OF THE DRAWINGS

In order that the invention may be more readily understood and so that further features thereof may be appreciated, the invention will now be described by way of example with reference to the accompanying drawings in which:

FIG. 10 is a cross-sectional view of the transducer of FIG. 9;

FIG. 11 is a perspective view of an arrangement for mounting the transducer of FIGS. 9 and 10;

FIG. 15 is a block diagram of another embodiment of the invention;

FIG. 16 is a block diagram of part of the embodiment shown in FIG. 15;

FIG. 17 is a block diagram of another part of the embodiment shown in FIG. 15;

FIG. 18 is a block diagram of another part of the embodiment shown in FIG. 15;

DETAILED DESCRIPTION OF THE PREFERRED EMBODIMENTS

Figure 1:
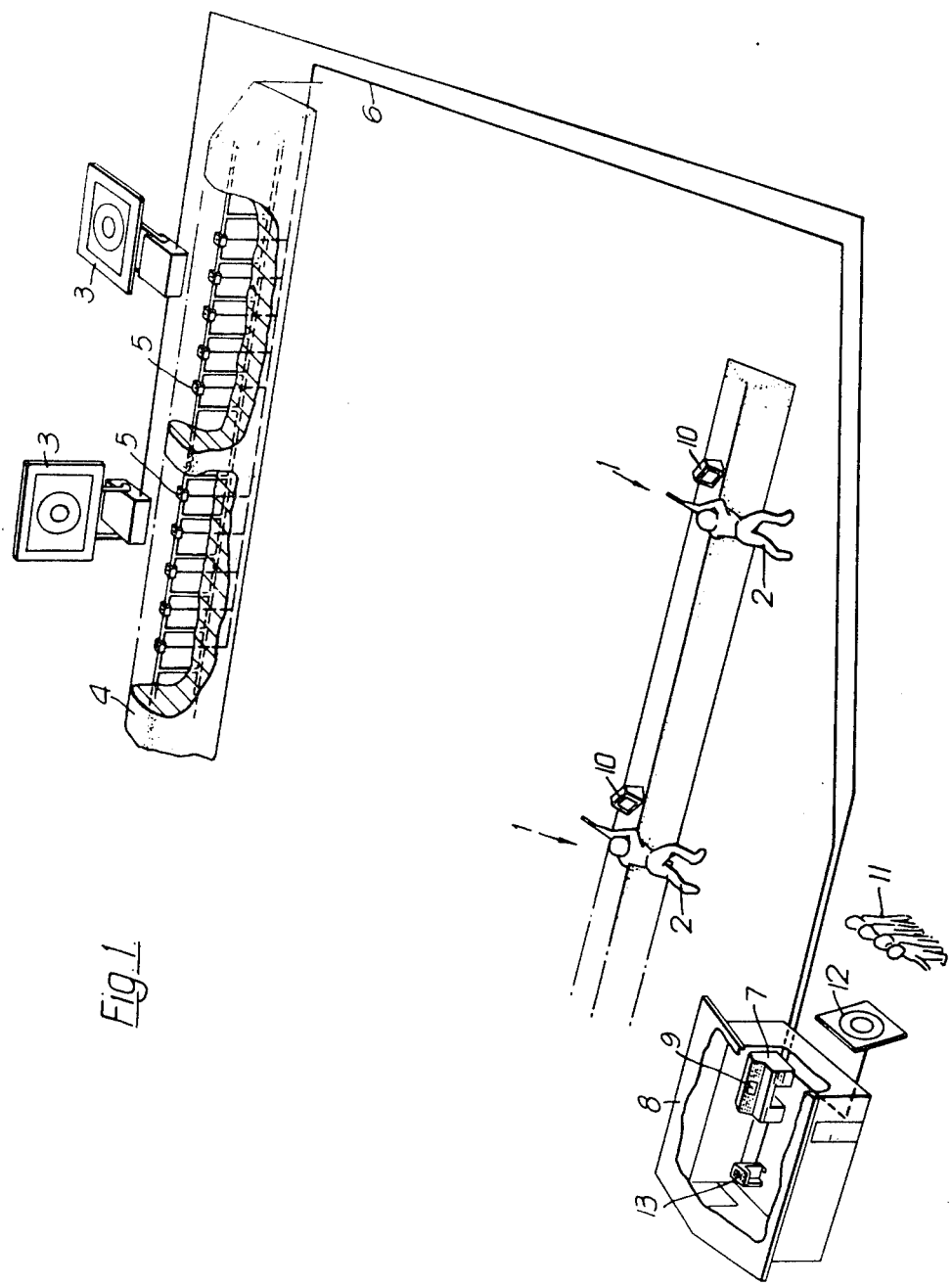
FIG. 1 is a perspective view of a rifle range provided with an apparatus in accordance with the present invention.

Referring to FIG. 1 of the accompanying drawings a rifle range in accordance with the present invention comprises a plurality of firing points 1 intended to be occupied by trainee marksmen 2, and a corresponding number of targets 3 intended to be fired at by the trainee marksmen. The targets are shown in a single bank, but a plurality of banks of targets spaced at increasing distances from the firing points may be provided. Located in front of the targets is an earth bank 4 or other protective device and located behind the earth bank 4, and thus out of the line of sight of the trainee marksmen 2, are at least three transducers 5, the transducers being arranged at spaced positions adjacent the lower edges of the target and being adapted to sense the shock waves generated by bullets fired at the targets. One long row of transducers may be provided in front of all the targets, or a separate group of transducers may be provided for each target. The transducers 5 will be described in more detail hereinafter. The transducers 5 are connected, by means of appropriate cables 6 to a computer 7 or other suitable calculating device which is accommodated in a control room 8 utilized by the range controller. The computer is adapted to calculate the position of each round fired at each target 3 when the shock wave generated by the round is detected by the transducers. The position of each bullet may be displayed on a visual display unit 9 in the control room and on a visual display unit 10 provided at each firing point 1. Thus the trainee marksman may see where each particular round impinges on the target. If spectators 11 are to be present, a large visual display device 12 may be connected to the computer 7 to enable the spectators 10 to view the progress of the shooting. In addition, or as an alternative to the provision of the display units, print out devices or paper punching devices 13 may be operated by the computer 7 to provide a printed or punched paper output indicating the point at which each bullet impinges upon the target 3.

It will be appreciated that with a system of this type it is not necessary to use rigid targets, and the only requirement of the target is that the target should be visible to the trainee marksman to provide an aiming point. Thus it is not necessary to utilise personnel to repair targets or indicate the position at which individual rounds impinged upon the target. It will also be appreciated that since the transducers 5 are located behind the earth bank 4, the only possible way in which the transducers can be damaged as a result of firing is as a consequence of a ricochet, and such ricochets are very unusual. The probability of any transducer being damaged is extremely low. As will be explained in more detail hereinafter, utilising a system of this type it is possible to obtain great accuracy and, in fact, with a target area of 6 ft. by 6 ft. it is possible to calculate the position of any bullet impinging on that target area with an accuracy of greater than ½ inch. It is believed that if appropriate steps are taken this accuracy may be improved.

Now that the invention has been broadly described, the apparatus will be described in more detail.

In one relatively simple embodiment of the invention it is assumed that the shock wave generated by a supersonic projectile expands in a direction perpendicular to the trajectory of the projectile, and thus a plurality of detectors in a single plane perpendicular to the trajectory will detect the shock wave at times dependent solely upon the distance of the respective detector from the trajectory.

Figure 2:
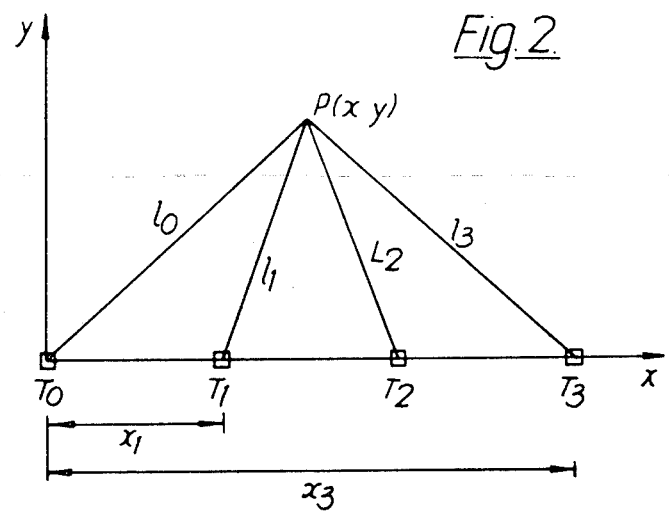
FIG. 2 is a diagram indicating the position of the trajectory of a projectile relative to four transducers and relative to co-ordinate axes.

In an embodiment of the invention of this type at least four transducers $T_0$, $T_1$, $T_2$, and $T_3$ as shown in FIG. 2 are arranged on a horizontal line extending from left to right. The distance from transducer $T_0$ to transducers $T_1$, $T_2$ and $T_3$ can be considered to be $x_1$, $x_2$ and $x_3$ respectively. If a bullet passes over the transducers at a general point $P(x, y)$ on co-ordinates based on transducer $T_o$, the distances from the pair x, y to the transducers $T_0$, $T_1$, $T_2$ and $T_3$ will be $l_0$, $l_1$, $l_2$ and $l_3$, respectively.

It is assumed that the trajectory of the bullet is perpendicular to the vertical plane containing the transducers, and also that the transducers will receive the shock wave from the bullet sequentially and with time delays varying in dependence upon the precise trajectory of the bullet. From the signals generated by the transducers, further signals $t_1$, $t_2$ and $t_3$ can be calculated, $t_1$ being the time delay (time difference) between the reception of the shock wave by transducer $T_1$ and transducer $T_0$, (this figure being negative if transducer $T_0$ receives the shock wave before transducer $T_1$), and $t_2$ and $t_3$ corresponding time delays for transducers $T_2$ and $T_3$.

It will be apparent that $$t_1 = (l_1 - l_0)/V_n \qquad (A1)$$

$$t_2 = (l_2 - l_0)/V_n \qquad (A2)$$

$$t_3 = (l_3 - l_0)/V_n \qquad (A3)$$

where $V_n$ is the velocity of the shock wave perpendicular to the trajectory of the bullet.

We have that
$$l_0^2 = y^2 + x^2$$
$$l_1^2 = y^2 + x^2 + x_1^2 - 2xx_1$$
$$l_2^2 = y^2 + x^2 + x_2^2 - 2xx_2$$
$$l_3^2 = y^2 + x^2 + x_3^2 - 2xx_3$$

Therefore $$l_1^2 - l_0^2 = (l_1 - l_0)(l_1 + l_0) = (l_1 - l_0)(l_1 - l_0 + 2.l_0) = x_1^2 - 2xx_1 \qquad B1$$

$$l_2^2 - l_0^2 = (l_2 - l_0)(l_2 + l_0) = (l_2 - l_0)(l_2 - l_0 + 2.l_0) = x_2^2 - 2xx_2 \qquad B2$$

$$l_3^2 - l_0^2 = (l_3 - l_0)(l_3 + l_0) = (l_3 - l_0)(l_3 - l_0 + 2.l_0) = x_3^2 - 2xx_2 \qquad B3$$

Substituting for $(l_1 - l_0)$ by $t_1 V_n$ etc:

$$V_n^2 t_1^2 + 2V_n t_1 l_0 = x_1^2 - 2xx_1 \qquad C1$$

$$V_n^2 t_2^2 + 2V_n t_2 l_0 = x_2^2 - 2xx_2 \qquad C2$$

$$V_n^2 t_3^2 + 2V_n t_3 l_0 = x_3^2 - 2xx_3 \qquad C3$$

Multiplying C1 by $t_2$ and C2 by $t_1$ and subtracting:
$$V_n^2 t_1 t_2 (t_1 - t_2) = x_1^2 t_2 - x_2^2 t_1 + 2x(x_2 t_1 - x_1 t_2) \qquad D1$$

Multiplying C1 by $t_3$ and C3 by $t_1$ and subtracting:
$$V_n^2 t_1 t_3 (t_1 - t_3) = x_1^2 t_3 - x_3^2 t_1 + 2x(x_3 t_1 - x_1 t_3) \qquad D2$$

Dividing D1 by D2 and rearranging gives $$x = \tfrac{1}{2} \left[ \frac{(x_3^2 t_1 - x_1^2 t_3) t_2 (t_1 - t_2) - (x_2^2 t_1 - x_1^2 t_2) t_3 (t_1 - t_3)}{(x_3 t_1 - x_1 t_3) t_2 (t_1 - t_2) - (x_2 t_1 - x_1 t_2) t_3 (t_1 - t_3)} \right]$$

Cyclic rearrangement of terms will also yield:

$$x = \frac{1}{2}\left[\frac{(x_1^2 t_2 - x_2^2 t_1)t_3(t_2 - t_3) - (x_3^2 t_2 - x_2^2 t_3)t_1(t_2 - t_1)}{(x_1 t_2 - x_2 t_1)t_3(t_2 - t_3) - (x_3 t_2 - x_2 t_3)t_1(t_2 - t_1)}\right]$$

and $$x = \frac{1}{2}\left[\frac{(x_2^2 t_3 - x_3^2 t_2)t_1(t_3 - t_1) - (x_1^2 t_3 - x_3^2 t_1)t_2(t_3 - t_2)}{(x_2 t_3 - x_3 t_2)t_1(t_3 - t_1) - (x_1 t_3 - x_3 t_1)t_2(t_3 - t_2)}\right]$$

All the values on the right of the equation are known. Having found x we may write from D1

$$V_n^2 = \frac{x_1 t_2(x_1 - 2x) - x_2 t_1(x_2 - 2x)}{t_1 t_2(t_1 - t_2)}$$

Cyclic rearrangement of terms will also yield $$V_n^2 = \frac{x_2 t_3(x_2 - 2x) - x_3 t_2(x_3 - 2x)}{t_2 t_3(t_2 - t_3)}$$

and $$V_n^2 = \frac{x_3 t_1(x_3 - 2x) - x_1 t_3(x_1 - 2x)}{t_3 t_1(t_3 - t_1)}$$

Thus we can measure the effective speed of sound; which enables the value of y to be determined as follows: Using C1 we may write $$l_0^2 = \frac{(x_1(x_1 - 2x) - V_n^2 t_1^2)^2}{4V_n^2 t_1^2} =$$

$$\frac{(x_2(x_2 - 2x) - V_n^2 t_2^2)^2}{4V_n^2 t_2^2} = \frac{(x_3(x_3 - 2x) - V_n^2 t_3^2)^2}{4V_n^2 t_3^2}$$

Hence we can find y:

$$y = [l_0^2 - x^2]^{\frac{1}{2}},$$

Figure 3:
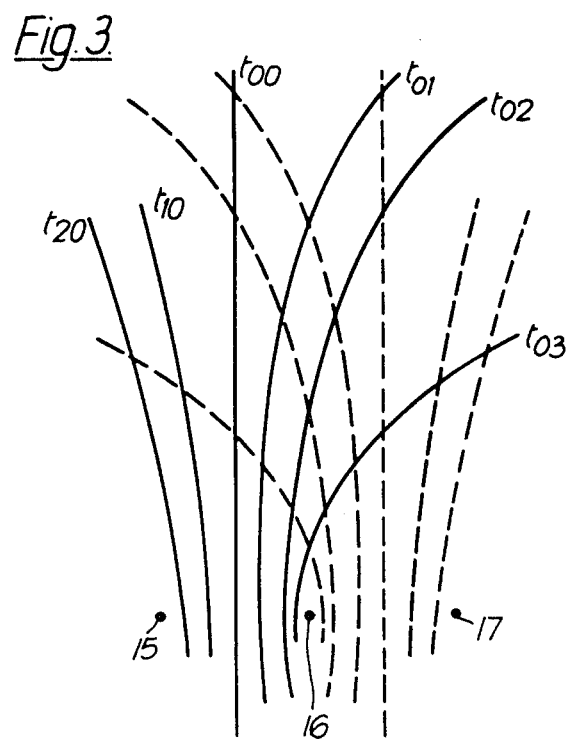
FIG. 3 illustrates hyperbolic co-ordinates defined by units of time difference between the instant of reception of shock waves by adjacent pairs of transducers.

As indicated above in an apparatus in accordance with the present invention a plurality of transducers are located beneath a target at which a trainee marksman is to fire. Consider an embodiment of the invention in which at least three transducers are arranged in a horizontal line, the transducers being equispaced. The transducers 15, 16, 17 are illustrated schematically in FIG. 3. The transducers each generate a signal at the time at which a shock wave generated by the bullet is detected, and the signals are fed to a timing device which calculates the time delays between the detection of the shock wave by the first transducer and the last transducer. Referring to FIG. 3 of the drawings, it can be seen that if the shock wave is detected by the transducers 15 and 16 simultaneously then the trajectory of the bullet must lie on the central vertical line $t_{00}$. However, if the difference in time of detections of the chock wave is one unit of time, the transducer 16 receiving the shock wave before transducer 15, then it will be appreciated that the trajectory of the bullet is somewhere on the hyperbolic line $t_{01}$. Similarly if the shock wave is detected by the transducer 15 one unit of time before it is detected by the transducer 16 then the trajectory of the bullet must be on the hyperbolic line $t_{10}$. It will readily be appreciated that a family of these hyperbolic curves may be generated, similar hyperbolic curves being defined by the combination of transducers 16, 17 and also by the combination of transducers 15, 17.

Figure 4:
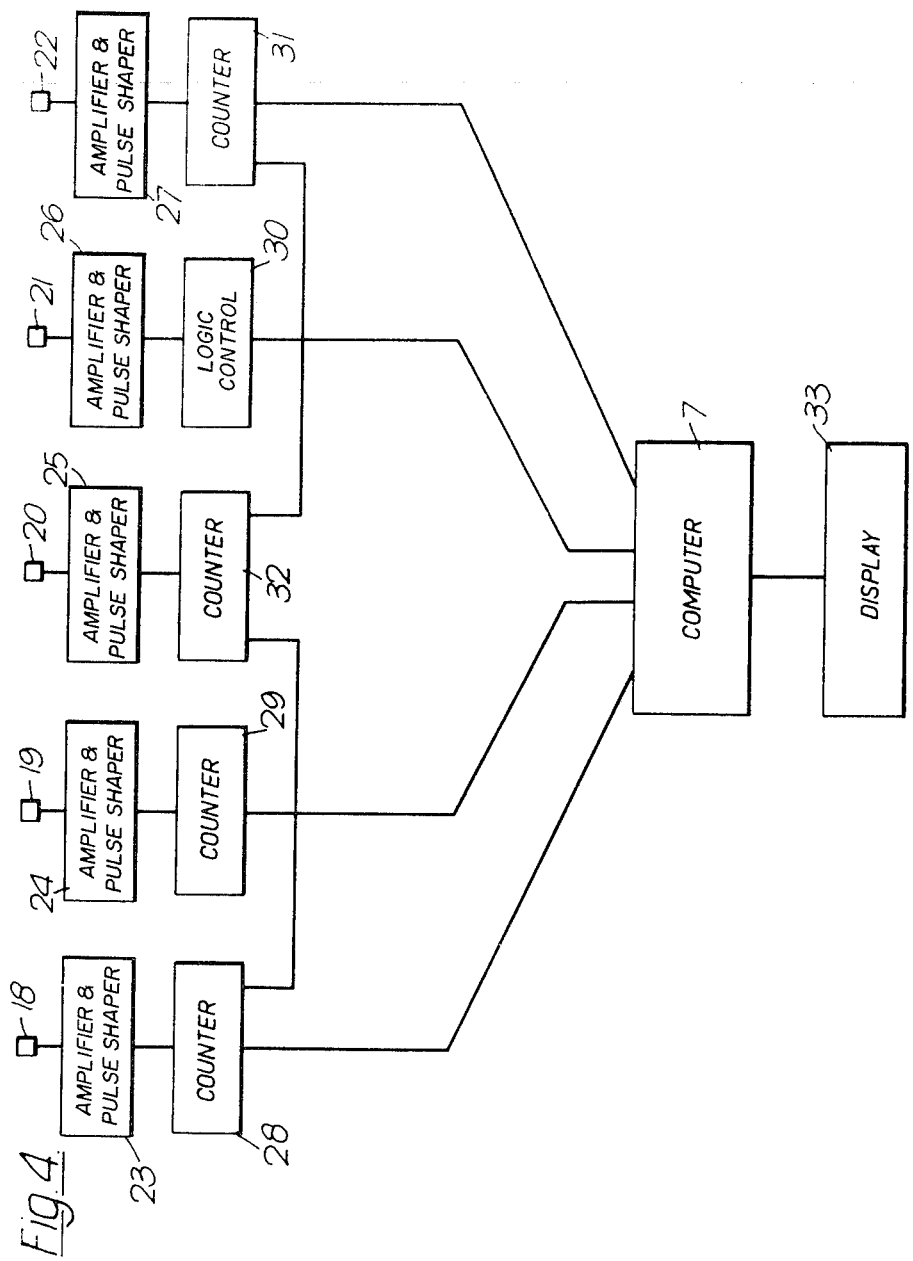
FIG. 4 is a block diagram of one embodiment of the invention.

In one specific embodiment of the invention based on the foregoing mathematical analysis, five transducers 18–22 (as shown in FIG. 4) are utilised which are mounted in position so that they are spaced apart in a row beneath the target area. A typical transducer construction that may be used will be described hereinafter. The output of each transducer is fed to a respective one of amplifiers 23–27 to amplify the output signal. A typical amplifier circuit will be described hereinafter. Counters 28, 29, 30 and 31 are connected respectively to the outputs of amplifiers 23, 24, 26 And 27. A logic control device 32 is connected to the output of the amplifier 25, and is also connected to provide a signal to each of the counters 28, 29, 30 and 31 when a signal is present on the output of amplifier 25. Each counter may be of the type 74191 sold by Texas Instruments. Each counter is connected so that if it initially receives a signal from the respective amplifier it will count at a predetermined rate in a negative sense until the control device 32 receives a signal from amplifier 25, and then the counter will stop. Alternatively, if the counter initially receives a signal from the control device 32, then the counter will count at the predetermined rate in the positive sense until the counter receives a signal from the associated amplifier.

Thus, as a bullet or other supersonic projectile passes over the transducer 18 to 22 and the shock wave is detected sequentially by the transducers, the counters 28, 29, 30 and 31 will store counts representative of the time difference between the instant of detection of the shock wave by transducers 18, 19, 21 and 22 respectively and transducer 20.

A computing device 7 is connected to the outputs of the counters, and includes a memory for storing the counts. The computing device 7 scans the stored time delays and calculates the time difference between each adjacent pair of transducers. Computing device 7 then compares the calculated time differences and selects the group of four adjacent transducers for which the calculated time differences are smallest in magnitude. The computing device then proceeds to calculate the position of the trajectory of the bullet from the measured values for $t_1$, $t_2$, and $t_3$, and known values for $x_1$, $x_2$ and $x_3$, in accordance with equations given above. The measured values of the distances between all the transducers ($x_1$, $x_2$ and $x_3$) are permanently stored in the computer memory. Once the position of the bullet is determined, this position can be displayed on an appropriate display device 32, printed by a printer, or otherwise utilized to indicate the shooting accuracy of the trainee marksman.

In the embodiment of the invention presently being described the computing device 7 can be considered to calculate the position of the trajectory of the bullet by determining the hyperbolic coordinates of the trajectory. For accurate results to be obtained it is necessary either to use at least four (preferably five) transducers and utilise information derived from each of the transducers to assist in calculating the position of the trajectory, or it is necessary to provide the computer with information concerning the velocity of the bullet and the velocity of sound in air. Thus, in certain circumstances it may be adequate to utilize three transducers. For example, where a certain amount of inaccuracy can be tolerated, and/or where match ammunition is being utilized, the computer or other calculating device can be pre-programmed or otherwise supplied with the bullet velocity and the sound velocity. Where, for example, three transducers are provided equispaced at a distance d, the x,y coordinates of the point P (x, y) at which the bullet trajectory intersects a target plane normal to the trajectory may be calculated from the following:

$$x = (t_1 - t_2)(V_n^2 t_1 t_2 + d^2)/2d(t_1 + t_2)$$

$$y = \sqrt{l_0^2 - x^2}$$

where $t_1$ is the difference in time between reception of the airborne shock wave at a center transducer $T_0$ and an outer transducer $T_1$, $t_2$ is the difference in time between reception of the shock wave at transducer $T_0$ and an outer transducer $T_2$ and $l_0$ is the distance from point P (x,y) to transducer $T_0$, and where $l_0 = (2d^2 - V_n^2(t_1^2 + t_2^2))/(2V_n(t_1 + t_2))$.

If four transducers are utilized there is a vertical error zone extending above the transducers. If a bullet is fired through this particular error zone there is a high probability that the computing device will erroneously calculate the position of the bullet and the error may be as large as several feet. Thus, even if four transducers are utilized, and the target is so positioned relative to the transducers that the error zone does not coincide with the target area, if a trainee marksman misses the target and the bullet passes through the error zone it is possible that the computer will calculate the position of the bullet erroneously, and will indicate that the bullet hit the target, while the bullet in reality missed the target. This error zone, is, in actual fact, symmetrically located between two of the transducers and thus, when a bullet passes through this error zone the two transducers with respect to which the error zone is symmetrically located with each detect the shock wave substantially simultaneously. It is possible to take account of this fact and to program the computing device to recognise a situation where the bullet has passed into the error zone, i.e. to recognise the situation where the two transducers in question receive the shock wave substantially simultaneously, and to provide an appropriate display or print out. Thus if the error zone is not on the target area the computer is to indicate that the bullet was a "miss" or to indicate that the bullet passed through the error zone. In any event a bullet passing into the error zone would be disregarded and would not be recorded as a "hit".

Since the existence of the above described error zone is disadvantageous, it is preferred to utilise at least five transducers as illustrated in FIG. 1. If such an arrangement is utilized there are five different notional groups of four transducers that can be selected from the five transducers. The computing device 7 is operative to store signals representative of the time of reception of the shock wave by each of the transducers 5, to calculate the position of the projectile by using one primary group of four transducers. However, when the computing device initially selects a group of four transducer outputs, it will determine whether the bullet or projectile passed through the error zone of that particular group of four transducers. If so, the computing device rejects that group and selects a further group of four transducer outputs from the five and repeats the calculation. Of course, in such a situation, it would be possible for the calculation to be repeated using each of the remaining four of the five possible transducer outputs groups, and for the computing device then to take an average or mean result, thus further reducing the error.

In utilizing a five transducer arrangement of this type it is possible to provide reasonable accuracy over a large rectangular area located immediately above the row of transducers. The only zones where accuracy cannot be guaranteed are located at the very side edges of the rectangular area above the transducers. If it is desired to eliminate the possible errors that may occur when a bullet passes through these zones, the transducers may be selected or adjusted so that each transducer only detects shock waves from a projectile within a predetermined distance of the transducer, this predetermined distance being selected so that bullets entering into the zones where errors are likely to occur are not detected by all the transducers. If the shock wave generated by a bullet is not detected by all the transducers the position of the bullet is not calculated. Alternatively, the computing device may be programmed to detect when a bullet passes within the error zone and to provide an appropriate output, since if the bullet does enter the error zone the various time differences between the instants of reception of the shock wave by the various transducers will have a very recognisable pattern.

In yet another embodiment of the invention, where the invention is utilized on a range having a large number of targets, it is possible to provide a long row of transducers, the transducers being located beneath the targets. Whenever a bullet is fired at a target the shock wave generated by the bullet will initially be detected by one transducer or by two transducers substantially simultaneously. Depending upon which transducer, or transducers, initially detect the shock wave, a group of four or five transducers surrounding that initial transducer or transducers is selected by the computing device. The times of shock wave detection by those transducers are utilized as a basis for the calculation.

Figure 5:
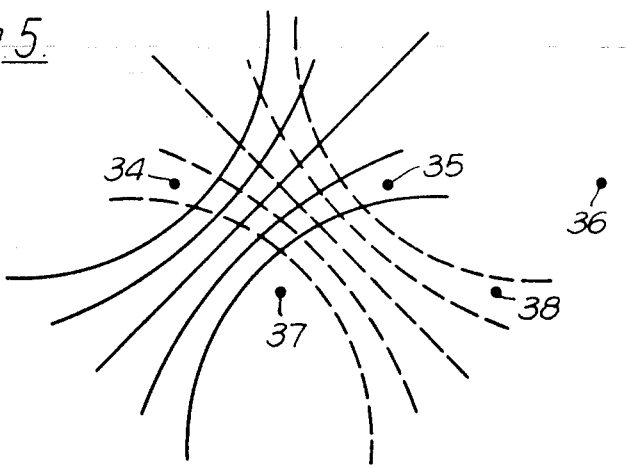
FIG. 5 illustrates an arrangement of staggered transducers and the corresponding intersecting hyperbolic co-ordinates.

While it has been indicated above that certain error zones appear where transducers are located in a straight horizontal line, it is envisaged that these error zones may be reduced or or obviated if the transducers are arranged, as shown in FIG. 5, in one upper horizontal row 34, 35, 36, and one lower horizontal row 37, 38, the transducers 37, 38 in the lower row being offset with regard to the transducers 34, 35, 36 in the upper row. Thus the transducers define a letter "W". It will be appreciated that the hyperbolic curves defined by the transducers when disposed in this way intersect at right angles or at an angle dependant upon the angle of incidence between the arms of the "W", thus providing a high degree of accuracy. Some of these hyperbolic curves are illustrated. Of course, in addition to the intersecting hyperbolic coordinates as illustrated, the three transducers 34, 35, 36 in the upper row can be utilised in precisely the same way as the three transducers illustrated in FIG. 3, and thus many intersecting hyperbolae can be defined.

Figure 6:
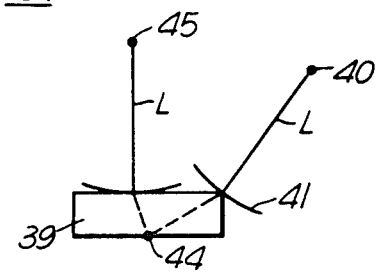
FIG. 6 illustrates a transducer element.
Figure 7:
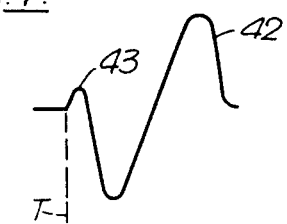
FIG. 7 illustrates the output signal generated by the transducer of FIG. 6.

In practicing the present invention it is possible to utilize as a transducer, a flat disc 39 of a piezoelectric material. Such a transducer may be located in a horizontal position as illustrated in FIG. 6. Such a transducer does possess several disadvantages, however. If a bullet 40 is fired to the right of the transducer the subsequent shock wave 41 will impinge on the edge or corner of the transducer 39, and the transducer will be compressed both in a vertical direction and in a horizontal direction. The resultant output of the transducer will have a wave form substantially as illustrated in FIG. 7, which is a negative going sinusoidal wave form 42 having a small positive "pip" 43 at the leading edge. It is desired to measure the time T illustrated on the wave form, and it is very difficult to detect this time T accurately since the amplitude of the "pip" 43 depends upon the precise position of a bullet, is difficult to distinguish from background noise, and can even be absent.

The computing device is provided with information concerning the position of the transducer, this information being the precise position of the center 44 of the transducer. All calculations are performed on the assumption that the transducer is at this particular position, and that the output signal generated by the transducer is indicative of the instant at which the shock wave arrives at this particular position. The transducer, however, provides an output with a predetermined response time as soon as the shock wave impinges upon the transducer. If a bullet 45 passes vertically above the transducer 39 the shock wave impinges directly on the upper surface of the transducer, generating an appropriate output signal. Now it can be seen that the trajectory of the bullet 40 fired to the right of the transducer is further from the point 44 than the trajectory of the bullet 45 passing immediately over the transducer.

However the distance between the transducer surface and each of the trajectories of the bullets 40, 45 is equal to a distance L. Since the transducer provides an output as soon as the shock wave impinges on the transducer, the times between the bullets passing and the output signal being generated are equal. Thus the output of the transducer would suggest that the trajectories of the bullets 40, 45 are equispaced from point 44, which is not correct. In other words, a slight timing error will be generated and the calculated trajectory of the bullet passing to the right of the transducer will be closer to the point 44 than it is in reality.

Figure 8:
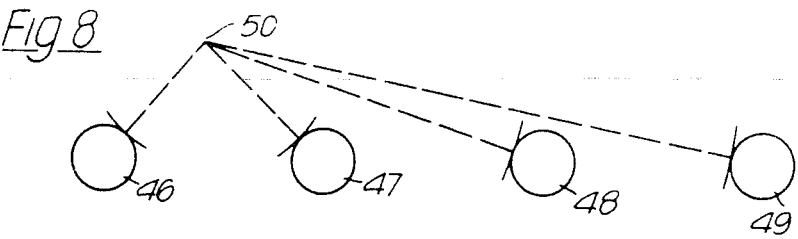
FIG. 8 is an elevational view of four transducers.

This particular disadvantage can be overcome by disposing the transducers in a vertical orientation so that the transducers are in the form of vertical discs 46, 47, 48, 49 (as shown in FIG. 8), the planar faces of the discs being directed towards the trainee marksman. As a bullet 50 passes over the discs and the resultant shock wave is generated the shock wave will always impinge upon the periphery of each disc, and the point of impingement of the shock wave on each disc will be an equal distance from the centre or origin of the disc. A constant timing error will thus be introduced into each signal generated by each transducer. Since only the time differences are used as a basis for the calculations this constant error will be cancelled out.

However, orienting the discs in a vertical position will not obviate the problem of the positive pip 43 at the beginning of the output signal 42, therefore, in the present invention, it is preferred to provide each transducer with a dome of a solid material having a convex surface exposed to the shock waves, the planar base of the dome being in intimate contact with the transducer material and being adapted to transmit shock waves from the atmosphere to the transducer. If a hemispherical dome is utilized, provided that the axis of the dome is pointing vertically upwards in front of the target, or is directed towards the trainee marksman, or is at an orientation between these two limiting orientations, the shock waves generated by the projectiles fired at the target will always strike the periphery of the hemispherical dome tangentially, and shock waves will be transmitted radially through the dome directly to the center of the transducer. Thus a constant timing error is introduced, this timing error being equal to the time taken for the shock wave to pass from the periphery of the hemispherical dome to the center thereof, and as indicated above such a constant timing error will be of no consequence.

It will be appreciated that the hemispherical dome serves to prevent or minimize the generation of the positive-going pip 43 at the beginning of the wave form generated by the transducer, and thus the output of the transducer now resembles more closely a sinusoidal wave form. However, it is important that the instant of commencement of this sinusoidal wave form be measured with great accuracy, and thus it is preferred to utilize a transducer that will have a very fast responce, though not necessarily a large response. It is found that if the response time of a series of piezo-electric discs of different size are compared, the response time is a function of the diameter of the disc, the smaller discs having a faster response time. However, it has been found that a response time of all discs with 5 mm diameter or smaller are substantially equal. It is to be noted, however, that the amplitude of the output of such a disc is proportional to its size, and it is for this reason that it is presently preferred to utilize a disc having a diameter of 5 mm, since such a size provides the fastest response time with the highest amplitude output signal. This size of disc is also preferred since the output of a transducer provided with such a disc has a frequency much higher than that of any noise or interference likely to be encountered and thus such noise can be filtered out. However, it is envisaged that smaller diameter discs may be preferred for reasons of improved accuracy.

Figure 9:
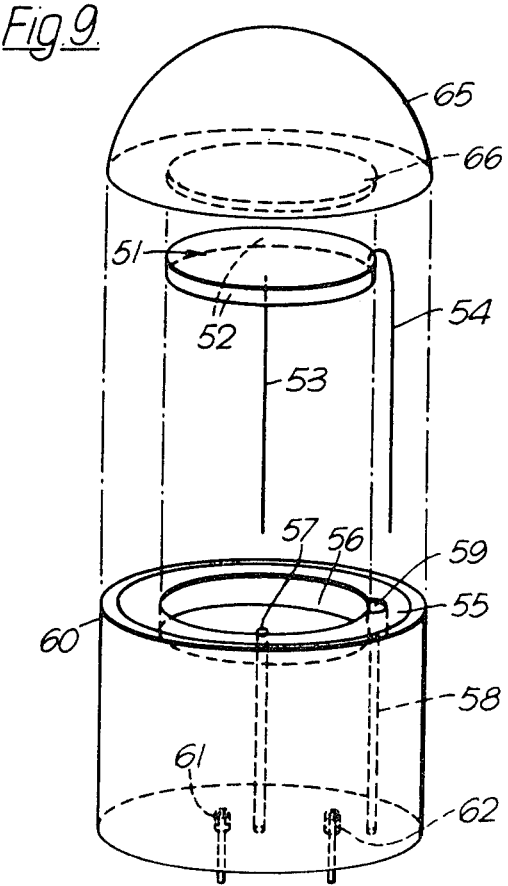
FIG. 9 is an exploded perspective view of a preferred type of transducer.

With reference to FIGS. 9 and 10 of the accompanying drawings a preferred transducer for use in connection with the present invention comprises a transducer element consisting of a disc 51 of piezo-electric material such as, for example, lead zirconium titanate. The disc 51 is 1 mm thick and 5 mm in diameter. The opposed planar faces of the disc 51 are provided with a coating of a conductive material 52, such as silver which may be provided in any convenient way, such as by vacuum deposition. Two electrically conductive wires 53, 54, for example, of copper or gold, are connected to the center of the lower surface of the disc and to the periphery of the upper surface of the disc by soldering or by ultrasonic bonding. The disc 52 is then firmly mounted in a housing which comprises a cylindrical member 55 having a 5 mm diameter recess 56 in one end face, the recess 56 having a depth of 1.5 mm, the recess 56 also being associated with an axial bore 57 extending through the member 55 to accommodate the wire 53 provided on the lower surface of the piezo-electric member. A second bore 58, parallel to bore 57, is formed in the periphery of the member 55, this bore 58 being adapted to accommodate the wire 54 and terminating in an open recess 59 adjacent the main recess 56. The member 55 may be formed of Tufnol, which is a phenolic resin bonded fabric, this material being readily obtainable in cylindrical form. The housing may be machined from this material, although alternatively, the housing may be formed of a two part phenolic resin such as that sold under the Trade Mark "Araldite", the resin being retained in a cylindrical aluminium case 60, and subsequently being machined: If the latter expedient is utilized the aluminium case 60 may be earthed to provide a Faraday cage to minimize noise. The piezo-electric material and wires are bonded into the member 55 with an adhesive such as Araldite or a cyano acrylic impact adhesive. Two small bores 61, 62 are formed in the lower surface of the member 55, and electrically conducting pins 62, 63 are mounted in the bores. The wires 53, 54, protruding from the lower ends of the bores 57, 58 are soldered to the pins, and the adhesive or other suitable setting material is utilized to retain all the elements in position and also to secure a solid hemispherical dome 65 to the transducer. The dome may be machined from aluminium or cast from a setting resin material such as that sold under the Trade Mark "Araldite". The dome 65 preferably has an outer diameter of about 8 mm, which is equal to the diameter of the housing. A centrally disposed projection 66 on the base of the dome member is adapted to contact the piezo-electric disc 51 and has the same diameter as the disc 51. Alternatively, the dome and the memeber 55 may be cast as a single integral unit.

The pins 63, 64 protruding from the base of the holder may be connected to a co-axial cable, and the entire connection may be encapsulated in soft rubber. The coaxial cable may be short (i.e. up to 1 meter in length) and is connected to a suitable amplifier adapted to amplify the output signal generated by the transducer. In an alternative embodiment of the invention the pins provided on the holder are connected directly to a printed circuit board upon which is mounted the amplifier, the printed circuit board being potted on to the base of the housing.

The housing coupled with its associated transducer, is mounted, as generally described above, in front of the target, and it is important that both the housing and any cable emerging from the housing be acoustically decoupled from any support of any other rigid structure that could possibly receive the shock wave detected by the transducer before the shock wave is received by the hemispherical dome provided on top of the transducer. Thus, if the transducers are mounted on a rigid horizontal framework it is important that the transducers are acoustically de-coupled from such a framework. The transducers may be mounted on a block of any suitable acoustic de-coupling medium, such as an expanded polymer foam, or a combination of polymer foam and metal plate. The most preferred material is closed cell foam polyethylene, this material being sold under the Trade Mark "Plastizote" by Bakelite Xylonite Limited. Of course, many other acoustic de-coupling materials may be used such as glass fibre cloth or mineral wool.

The transducer may be mounted by taking a block 67 of acoustically coupling medium as illustrated in FIG. 11, forming a hole or recess 68 within the block of material dimensioned to accommodate the transducer and holder and inserting the housing into the recess. The entire block may then be clamped in any convenient way, such as by clamps 69 to a suitable framework or support 70, these items being illustrated schematically.

When the transducers have been positioned relative to the target it is necessary for information concerning the precise position of each transducer to be supplied to the computer together with information concerning the position of each target relative to the transducer. The appropriate distances may be measured carefully and the appropriate information may be fed to the transducer, or other methods may be used for supplying information to the computer. For example, instead of measuring the distance between the transducers with a ruler or the like, a rod of metal may be located so that the rod of metal is touching each of the transducers, and an ultrasonic pulse may be propagated along the rod of metal, the time of arrival of the pulse at each transducer being measured and recorded by the computer. The computer is provided with the speed of the ultrasonic pulse wave along the metallic rod, and consequently the computer is able to calculate, with a high degree of accuracy, the precise position of each transducer.

It will be appreciated that when bullets are fired towards the targets the position of the bullet is measured relative to the transducer, and it is this position that is eventually displayed by the computer. Thus it is important that the computer be provided with precise information concerning the position of the target relative to the transducers.

The amplitude of the signal generated by each of the transducers as described above will depend upon the velocity of the bullet, the precise nature of the bullet, the distance of the bullet from the transducer, and many other variable factors.

Figure 12:
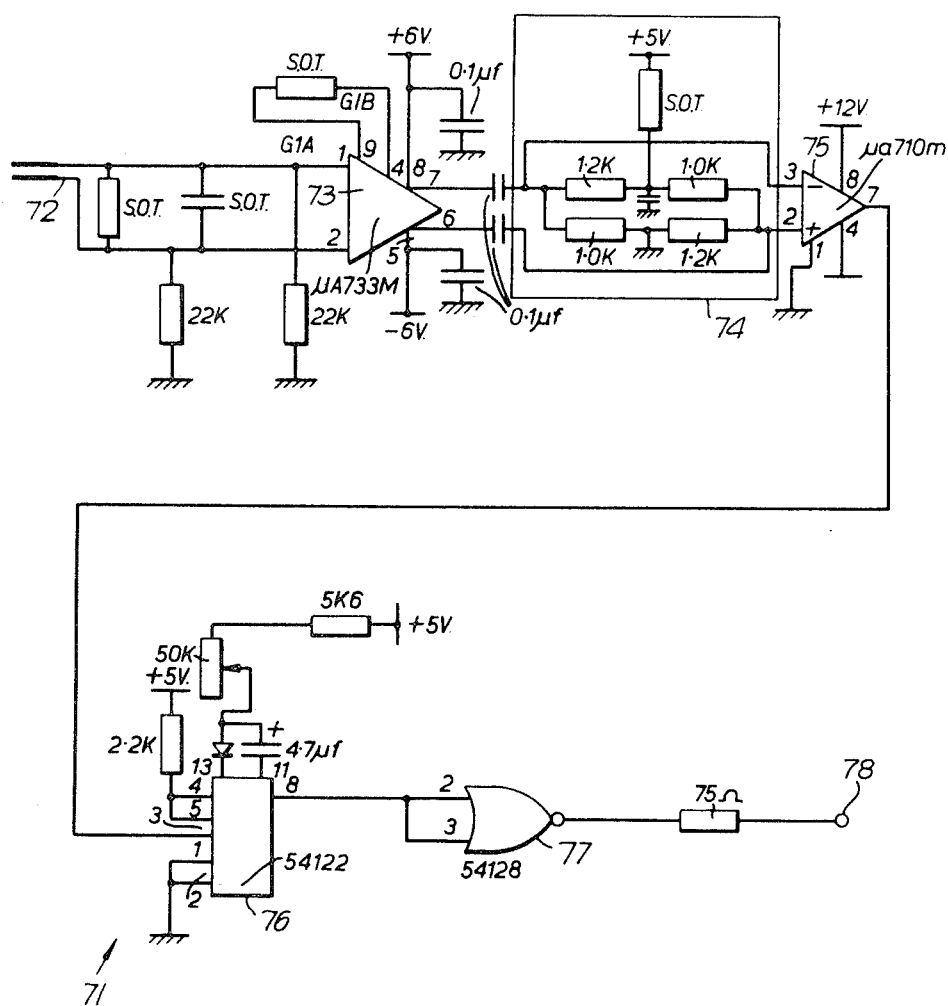
FIG. 12 is a circuit diagram of an amplifier associated with the transducer of FIGS. 9 and 10.

From the transducer signal it is necessary to obtain a signal which can be utilized to operate a means which measures the time at which the shock wave was detected by the transducer. It is accordingly desired to change the analog transducer signal of FIG. 7 having an imprecise leading edge, into a digital signal. The transducer signal is fed to an amplifier which provides a digital signal having a fast leading edge, the amplifier being triggered by a shock wave but not triggered by any noise. The preferred amplifier 71 is shown in FIG. 12 of the accompanying drawings, and it is to be noted that the signal is supplied to the amplifier along the coaxial cable 72, the two cores of the coaxial cable being fed past various biasing resistors to the input of a differential amplifier 73. The output of the differential amplifier 73 is AC coupled to a trigger threshold comparator 74 in which the signal is compared with a predetermined reference signal to prevent the entire apparatus being triggered by noise rather than a shock wave. The trigger threshold comparator 74 may be adjusted to set the threshold sensitivity. The output of the comparator is amplified with a linear amplifier arrangement 75, 76, 77 and an amplified signal is provided at output 78.

The component references shown in FIG. 12 of the accompanying drawings identify the components utilised in the preferred embodiment of the invention, these components being military grade components available from Texas Instruments.

The output of the amplifier 71 can be considered a digital signal, since it indicates whether the transducer output is greater or less than the predetermined threshold.

As already indicated the mathematical analysis given above is based on the assumption that the shock wave generated by a supersonic projectile expands perpendicularly to the trajectory of the projectile; while embodiments of the invention based on the above mathematical analysis have proven satisfactory, their accuracy cannot be improved over certain limits.

Figure 13:
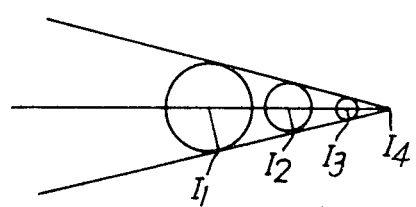
FIG. 13 is an elevational view illustrating the shock wave generated by a supersonic projectile.

It has now been appreciated that when a bullet is fired from a gun such as a rifle, at each instant of time the supersonic bullet generates a shock wave, each shock wave subsequently expanding spherically at a linear rate. FIG. 13 of the accompanying drawings illustrates the trajectory of a bullet and indicates the positions occupied by the bullet at instants I1–I4. The figure also illustrates the spherical shock waves generated by the bullet at those instances, the shock waves all being illustrated at the instant I4. It will be appreciated that the diameter of the shock wave at the position occupied by the bullet at time I4 is nil, whereas the diameter of the shock wave generated by the bullet at time I1 is relatively large. It will also be appreciated from FIG. 13 of the accompanying drawings, that the envelope of the spheres defines a generally conical shock wave, and since a shock wave is generated at every instant such a conical envelope is generated.

Figure 14:
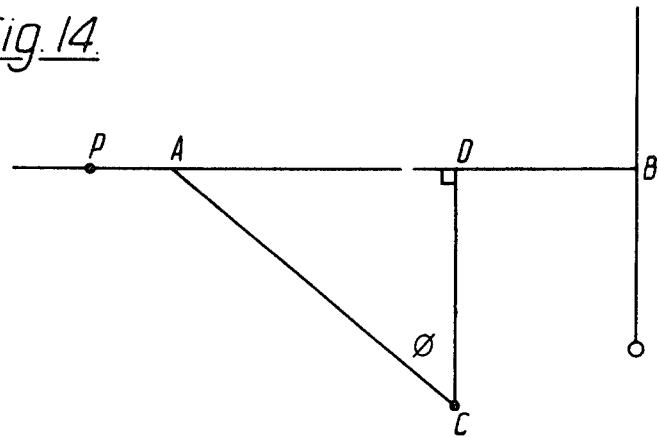
FIG. 14 is a representation of the trajectory of a projectile and the detection of the resultant shock wave by a transducer, points being identified thereon to assist in mathematical analysis of the situation.

FIG. 14 illustrates the trajectory of a bullet or other projectile approaching the target, and also illustrates the shock wave generated when the bullet is at the position A being detected by a sensor C. The bullet impinges on the target at the point B.

It is possible to consider the situation from a mathematical approach, initially assuming that at a time $T_0$ the bullet is at a position P somewhere on the trajectory, and also by constructing a perpendicular from point D on the trajectory to the sensor C. The shock wave generated when the bullet is at point A on the trajectory is detected by the transducer C.

Consider a bullet travelling along the trajectory PADB ultimately striking the target at B. It is required to find the coordinates of the point B in the target plane with respect to the origin O of the coordinate system.

P presents the position of the bullet when a timing period is started. The shock wave which eventually triggers the sensor at C originates from point A on the bullet trajectory. D is a point on the trajectory such that CD is perpendicular to AD.

It is assumed that the bullet trajectory is linear over the (relatively short) distance PB. Let T be a unit vector in the direction of the trajectory.

From the properties of shock waves from supersonic projectiles, we have that $$\sin \phi = v_s/v_b \quad (1)$$

where $v_s$ is the velocity of sound and $v_b$ is the velocity of the bullet.

Now, the time for the shock wave to reach the sensor at C is given by $$t = \text{time for bullet to travel} + \text{time for shock wave to}$$
$$\text{from } P \text{ to } A \quad\quad\quad \text{travel from } A \text{ to } C$$

Starting with this initial mathematical concept it is possible to derive a vector equation relating the various vectorial parameters and t.

A similar equation will hold for each of the sensors in the sensor array. When the time t is known for each sensor in the array it is possible to solve the equations as a set of simultaneous equations. In one case the equations will each contain five unknowns, and thus five equations must be solved simultaneously. The equations may be solved iteratively.

A rifle range that is based on such a mathematical approach will now be described.

FIG. 15 of the accompanying drawings illustrates the arrangement of transducers 79 on a range having a plurality of lanes 80 and a plurality of target banks 81. The transducers 79 of each target bank 81 are connected to a timing arrangement 82 (which will be described hereinafter) and the output of each timing arrangement is fed to a buffer 83. Thus referring to FIG. 15 of the accompanying drawings there are three banks of targets 81 which provide signals from the transducers to the three timing arrangements 82, and thus to three buffers 83. The buffers are interrogated sequentially by computing device 7, and when any information is available at the output of a buffer 83, then that information is transferred into computing device 7, and subsequently the buffer is cleared. Each target bank is provided with a long row of of transducers located in front of each target. There is not a specific group of transducers located in front of each individual target. It is to be appreciated that in utilising an arrangement in which information from each bank of transducers is stored in a buffer, with the buffers being interrogated by a single computing device, the amount of wiring needed on the range is minimized, since otherwise each transducer would need to be individually connected to a computing device.

Referring to FIG. 16, each timing arrangement 82 comprises a group of tristate latches 84, each latch being connected to the output of the amplifier 71 associated with an individual transducer. Latches 84 may be of the type sold by Texas Instruments under the reference No. 74363. Each of the tristate latches 84 is connected to an output of a 24 bit clock signal generator 85, generator 85 providing successive signals indicative of the precise time. A new signal is generated every ten nano seconds. The arrangement is such that when the digital signal is provided from the amplifier 71 associated with a transducer to a latch 84, the latch will record the 24 bit clock signal present on the output of the 24 bit clock signal generator 85 at that instant. The digital signal from the amplifier 71 is also fed, simultaneously, to a control device 86 which subsequently causes the signal recorded on the latch 84, together with a signal permanently recorded on a read only memory 87 associated with the latch, to be transferred to the buffer 83. The signal stored on the read only memory 87 is a signal which identifies the transducer associated with that particular latch 84. The buffer 83 is a "first in-first out" type device and temporarily stores the information. The information stored in the buffer 83 comprises the time signal temporarily stored in the latch 84, and the transducer identity signal permanently stored in the associated read only memory 87. Once this information has been accepted by the buffer 83, a further control signal is sent to the latch 84; the latch then clears and is ready to store another signal from the clock signal generator 85 on receipt of a further shock wave from the associated transducer. Thus, the buffer 83 will store a large number of separate items of information, each item of information comprising a signal identifying a particular transducer and a signal representative of the time of receipt of a shock wave by that particular transducer. Of course, if two successive shock waves are detected by the same transducer, then two successive signals will be temporarily stored in the associated buffer, comprising the same transducer identifying signal, but having different signals representative of the time of receipt of a shock wave by that transducer.

When a signal stored in the buffer is available in the output of one buffer 83, a signal is forwarded to cause computing device 7 to interrogate each of the buffers, accepting information from the buffer 83 that has information present on its output. Referring now to FIG. 17, information from the buffer 83 is fed to a first mini-computer 88 as well as to a memory 89 present in the computing assembly 7. These components, and other components present in the computing assembly 7, are connected together by a maxibus 90 (shown in FIG. 17 in the accompanying drawings). The arrangement operates in real time, that is to say, time not shared between the various components, but the components operate independently of each other, and the components may thus operate simultaneously. The mini-computer 88, which may be a Texas Instruments TMS 9900 computer associated with a local memory comprising an Intel 2102 memory, initially scans the data received from the buffer and compares the various times of reception of the shock waves by the transducers. From this initial comparison various "groups" of received signals are identified, each such group of signals comprising shock wave detection times within a predetermined range and thus being signals that are possibly derived from a single projectile. For example, as a projectile passes over the transducers the shock wave generated by that projectile will be detected by five or six transducers of a long row of transducers located under the targets at which the projectile is aimed. These transducers will all detect the shock wave within a comparatively short period of time, and thus the signals detected by the transducers can easily be distinguished from the signals received by the transducers from a subsequent projectile, since the signals received from the subsequent projectile will be much later in time.

As indicated above, the mini-computer 88 selects likely groups of received signals and feeds the signals to a special purpose calculator or pre-programmed general purpose computer 91 having a PROM (programmed readout memory) which subjects the input data to the predetermined mathematical operations described above, and provides an output signal representative of the position of the trajectory of the projectile.

It is preferable that the programming of unit 91 is contained in the hardware of the device, so that no software programme is necessary. Thus the device can operate at a very high speed. Such an approach is feasible for this portion of computing arrangement 7 since unit 91 will only be required to perform one mathematical function. However, it is to be appreciated that a software-programmed computer could be used, provided that such a computer was able to operate with sufficient speed. After the maths unit 91 has calculated the position of the projectile trajectory relative to the target area, that information is fed to memory 89, and from there to a visual display assembly 92.

The visual display assembly 92 comprises means for generating a signal which, when fed to a cathode ray tube, causes that cathode ray tube to display a representation of a target. Referring to FIG. 18, the preferred means for generating such a signal comprises a closed circuit television camera 94 associated with means 95 for projecting an image on a photographic slide 96 into the camera. The camera 94 operates in the usual way and thus produces a video signal representative of the image on the slide 96. Also present on the slide 96 are various marks or lines defining X and Y axes, the position of the target being known with regard to these axes. Part of the video signal from the camera is fed to two separate detector circuits 97, 98 which are adapted to detect the position of the beam scanning the target in the camera at any instant, the detector circuits 97, 98 being connected to a blanking device 99 adapted to blank out that part of the video signal which relates to the marks defining the axes. Thus the resulting video signal on line 100 comprises only a part of the video signal generated by the camera 94, that being the part of the signal representative of the image of the target. The signals generated by the X detector and Y detector are also fed to a separate comparator 101, this comparator being provided with information, from the computing device 7, comprising the precise position of each projectile detected by the system. The comparator 101 compares the position of the projectile with the signals from the X detector and Y detector, and when the signals correspond, that is to say when the beam in the camera 94 is directed at the area of the image projected into the camera 94 corresponding to the area of the target on the range that has been impinged by the projectile, then the comparator provides an output signal which is fed to an exclusive OR gate 102. The output of the blank 99 is fed to a cathode ray tube 103 via the exclusive OR gate 102, and it will be appreciated that the cathode ray tube will display an image of the target derived by the camera 94 from the slide 96, and will also display, on that image, areas where the color of the image has been reversed indicative of the points of the target impinged upon by the bullets or projectiles fired on the range. Of course, it is assumed that the bullet or projectile will impinge upon the target at the position calculated by the computer from the informtion derived by the transducers.

One visual display unit 92 may be provided for a range controller, and the range controller may select any target of the plurality of targets on the range as being a target of interest, and then the visual display unit will display a representation of that particular target and a representation of the positions at which projectiles fired at that target have impinged on the target or passed by the target. A plurality of such visual display units may be provided for a plurality of range controllers, and indeed, as envisaged in the opening paragraphs of this description an individual display unit may be provided for each trainee marksman so that the marksman may immediately see where each bullet goes.

It is envisaged that in a range in accordance with the invention the individual targets will each be associated with a mechanism for raising the target to an exposed position and lowering the target to a concealed position. These mechanisms may be controlled by the computer assembly, and the computer assembly may include a users programme store 104 on which a predetermined programme of movements of the targets may be stored, the targets executing these predetermined movements when the stored programme is activated. A second mini-computer 105 which again may be a Texas TMS 9900 computer may be provided connected to the mechanical devices 106 which are provided to move the targets, this computer recording the position of each particular target and checking the correct functioning of each particular target. A further visual display unit 107 may be provided in such an embodiment of the invention, this display unit displaying images depicting the various targets present on the range, the display present on the visual display unit at any particular time being indicative of the condition of each target, that is to say, whether the target is in the raised position or in the lowered position, and also indicating the number of hits that have been scored on any particular target. It is envisaged that this particular visual display unit will be provided for a supervisory range controller who may, from considering the visual display unit, assess the precise condition of each target present on the range. This visual display unit is also adapted to indicate a malfunction of any particular target.

A printer 108 is also associated with the computer assembly, the printer being operable to provide print-outs of any of the information present in the store. A paper puncher may also be provided.

The main computer 109 which provides a controlling function is preferably a computer sold by Computer Automation (Naked Mini Division) of Irvine, Calif., as computer OS 1 4/10, the users programme storage 104 is preferably a floppy disc sub system mode 18566-XX as sold by Computer Automation, the main memory 89 is preferably a core memory of up to 32K words as sold by Computer Automation, and the preferred printer 108 is a Centronix 306, also available from Computer Automation.

It will be appreciated that many modifications may be made, and the computer may be provided with facilities for calculating a score attributable to any particular projectile, this score being displayed on the appropriate visual display unit.

The targets utilised in a range in accordance with the present invention may be static targets, may be targets that rise and fall in response to command signals as shown in FIG. 1, or may merely be sprays of water or the like with visual images representative of the targets projected on them. If the targets are of the type that rise and fall, the targets may be remote controlled by signals on a cable, as described above, although the targets may be controlled by radio signals. The computer may be operated to cause a target to fall briefly whenever the target is actually hit by a trainee marksman. Furthermore, while the invention has been described with reference specifically to a fixed rifle range, it is to be appreciated that the invention may be utilised in a range where targets move along on trolleys, the transducers also being mounted on the trolleys in a fixed position relative to the targets. Alternatively, the invention may be utilised in connection with ground-to-air or air-to-air weapons training, in which case the transducers would be mounted on the drogue which is the target.

When a range as described above is utilised for training a large number of marksmen the computer which is located at a central control console may perform many functions and the precise functions performed by the computer may be controlled by various push buttons or the like provided on the control console.

Initially the computer may be adapted to calculate the position of each round fired at each target and to provide signals to visual display units provided adjacent each trainee marksman so that each of the visual display units displays a representation of the target at which the trainee marksman is aiming, and also provides an indication of the points at which the trainee marksman has hit the target in any particular firing session. Thus, if a trainee marksman is to fire ten rounds at the target, as the rounds are successively fired at the target so the position of impact of the rounds on the target may be displayed on the appropriate visual display unit.

Of course, near-misses can also be displayed upon the visual display unit, since such near-misses will be detected by the transducers. At the end of a shooting session if the marksman has been reasonably accurate in his shooting there should be ten points marked on the representation of the target, indicating precisely where the rounds have hit the target. It is possible that the various points displayed on the display unit may be associated with numbers indicating the precise order in which the rounds were fired at the target, thus permitting the marksman to assess whether his accuracy was improving or not during the shooting session.

The computer may also calculate for each target for each shooting session in the overall dimension of the "Group" as fired by the training marksman. These figures may also be displayed on the individual display unit 9 provided for each trainee marksman. Alternatively, the number of "hits" and the number of "misses" may be recorded and displayed, or the score obtained by the marksman may be displayed.

It is envisaged that the computer 7 may be programmed to draw the attention of the range controller to any trainee marksman who is firing very inaccurately to enable the range controller to provide that trainee marksman with instructions or advice. The central control console is provided with a display device 8 enabling the trainer instantly to view a representation of any one of the targets, this representation corresponding precisely with the representation shown on the visual display of the appropriate trainee marksman. Thus the trainer may monitor the progress of each trainee marksman.

The printer 13 may merely print the score and grouping obtained by each of the trainee marksmen during a shooting session, or the printer may be operated to provide a print-out representation of any or all of the targets including a representation of the points at which each of the targets has been hit by bullets. Such a print-out may constitute a permanent record of the shooting of any particular marksman.

The targets 3 utilised with the present invention may be static targets, and it will be appreciated that since the targets only function as an aiming mark it will not be necessary to replace any target until the target is virtually totally destroyed. It will also be appreciated that the invention may be used with advantage in connection with targets that can be moved from a concealed position to an exposed or firing position, and vice-versa. Targets of this type are illustrated in FIG. 1 of the accompanying drawings. The invention may also be used in connection with targets mounted on trollies for movement along a predetermined track, the transducers also being mounted directly or indirectly on the trolloy for movement with the target. Of course, the invention may be used in conjunction with many facilites, such as lights to illuminate the target to permit shooting to be conducted after dark, and means on or adjacent the target to simulate retaliatory fire. Such means may be controlled by the computer to be operated in response to a shot fired at the target but which is a near miss. Many further possibilities will suggest themselves to those skilled in the art.

The mathematical analysis given above presumes that the air in which the projectile is fired is still, but if the range is an open air range the possibility always exists that the wind may be blowing. The following mathematical analysis takes account of the effect of wind.

Figure 19:
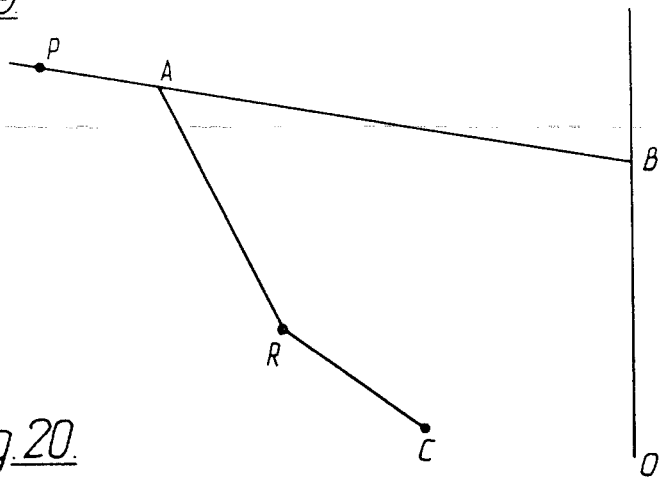
FIG. 19 is a representation of the trajectory of a projectile and the detection of the resultant shock wave by a transducer, points being identified thereon to assist in mathematical analysis of the situation.

Referring to FIG. 19 a bullet travels along the trajectory PAB, eventually striking the target at B, whose coordinates are to be found.

The shock wave which eventually triggers the sensor at C initiates at point A on the bullet trajectory.

P is the position of the bullet when a timing period is started, i.e. P represents an arbitrary origin of timing.

O, a point in the target plane, is the origin of our coordinate system.

Now let the total time for the signal to reach C from P be t, t is made of the time taken for the bullet to reach A and the time taken for the shock wave to reach C from A. Let these be $t_1$ and $t_2$ respectively.

We can regard the shock wave motion as being a spherical expanding wave front in moving air. In time interval $t_2$, the centre of the spherical disturbance has moved from A to R due to the effect of wind, while the disturbance has expanded to radius RC.

Again it is possible to define a vector equation relating various vectorial parameters and the sum of $t_1$ and $t_2$.

For example such an equation will relate the time of arrival of the shock wave at a sensor C, to the position of the sensor and the coordinates of the bullet hit position in the target plane.

A similar equation will hold for each of the sensors in the array, and sufficient sensors will allow equation to be solved for the various unknowns.

In practice iterative methods may be adopted for solving the equations.

When wind is taken into account there are more unknowns and thus more items of input data have to be available to enable the position of the projectile to be determined. When solving simultaneous equations there have to be as many equations as there are unknowns, and thus a large number of time differences have to be measured if accurate results are to be obtained.

In an alternative approach to the problems posed by the existence of wind the speed and direction of the wind may be measured and fed to the computer, and due account of the wind speed may be taken into account in performing the necessary calculations.

One convenient way of measuring the wind speed, or at least measuring the effects of the wind speed, is to provide one or more sound sources, such as sound emitting transducers, located at predetermined points relative to the transducer array. The sound emitting transducers are controlled by the computer and emit sounds of such a frequency that they may be detected by the transducers. The transducers and timing devices measure the time of detection of the sound waves generated by the transducers and these times are compared with the times at which the transducers are activated. This comparison enables the effects of wind to be measured accurately, and the effects of wind can thus be monitored instant by instant, and at several parts of the range. This is of particular use in blustery conditions.

With the transducers arranged in a straight line or in a staggered fashion four transducers enable accurate results to be obtained if one assumes that the projectile travels perpendicularly to the target and there is no wind, five transducers enable accurate results to be obtained if the projectile has a known oblique incidence and there is no wind, six transducers enable accurate results to be obtained if the projectile has an unknown horizontal component of incidence and a known vertical component and there is no wind, seven transducers enable accurate results to be obtained for normal incidence and an unknown wind factor, and for known oblique incidence and an unknown wind factor; and eight transducers enable accurate results to be obtained for bullets with an unknown horizontal component of incidence and a known vertical component of incidence if there is no wind.

If the transducers are in the staggered, two row arrangement, six transducers enable accurate results to be obtained if the projectile has a known horizontal component of incidence, an unknown vertical component of incidence and there is no wind, seven transducers enable accurate results to be obtained if the projectile has an unknown incidence and there is no wind, eight transducers enable accurate results to be obtained if the projectile has a known horizontal component of incidence, an unknown horizontal component of incidence and there is an unknown wind factor, and nine transducers enable accurate results to be obtained when the projectile has unknown incidence and there is an unknown wind factor.

The numbers of transducers listed above indicate the number of transducers in the group selected by the computer, and timing signals must be received by the computer from the specified number of transducers if the position of a projectile is to be calculated accurately in each of the specified set of conditions.

Figure 20:
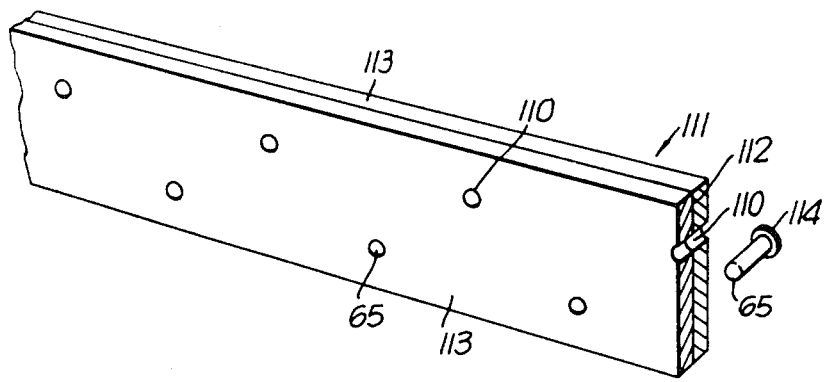
FIG. 20 is a perspective view, partly cut away, of a panel for supporting transducers.
Figure 21:
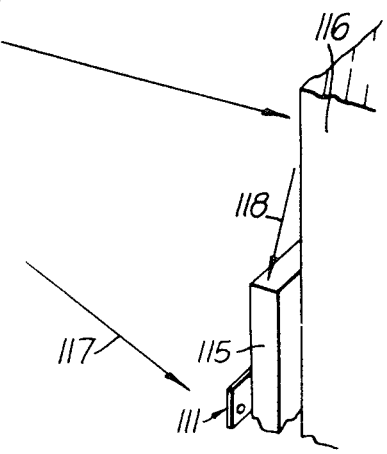
FIG. 21 is a side view of a target and associated transducers illustrating a block of sound absorbing material.

From the foregoing it will be appreciated that on many occasions it is preferable to mount the transducers in a staggered or non-linear arrangement. One preferred method of mounting the transducers in this fashion is illustrated in FIG. 20. The transducers are mounted within appropriately spaced apertures 110 formed in a panel 111 comprising a central rigid sheet of metal 112 the faces of which are provided with sheets of sound absorbing material 113. The domes 65 of the transducers protrude from the front face of the panel 111 and are thus exposed to the shock waves. The rear end of each transducer is provided with a radially extending flange 114 which is adapted to contact the rear surface of the panel 111 to assist in locating the transducers. The apertures 110 can be accurately located by drilling the apertures with an appropriate jig. If the spacing between the apertures tends to vary with varying temperature as a result of thermal expansion means may be provided to measure the temperature and to provide compensating information to the computer 7. The panel 111 may be as long as desired, and may accommodate as many transducers as required.

The transducers may detect secondary shock waves generated when the projectile impinges on a rigid target located adjacent the transducers. The timing devices, and thus the computer, may be unable to distinguish between such secondary shock waves, and the shock waves that are generated primarily by the projectile. Thus it is preferred to locate the means 111 supporting the transducers adjacent a block of sound absorbing material or other sound absorbing medium, located between the transducers and the target 116 as shown in FIG. 1. A shock wave travelling in the direction of arrow 117 and generated by a bullet will thus be detected by the transducers, but a shock wave emanating from the target and travelling in the direction of arrow 118 will not be detected by the transducers. Thus the transducers are in the shadow of the member 115.

Figure 22:
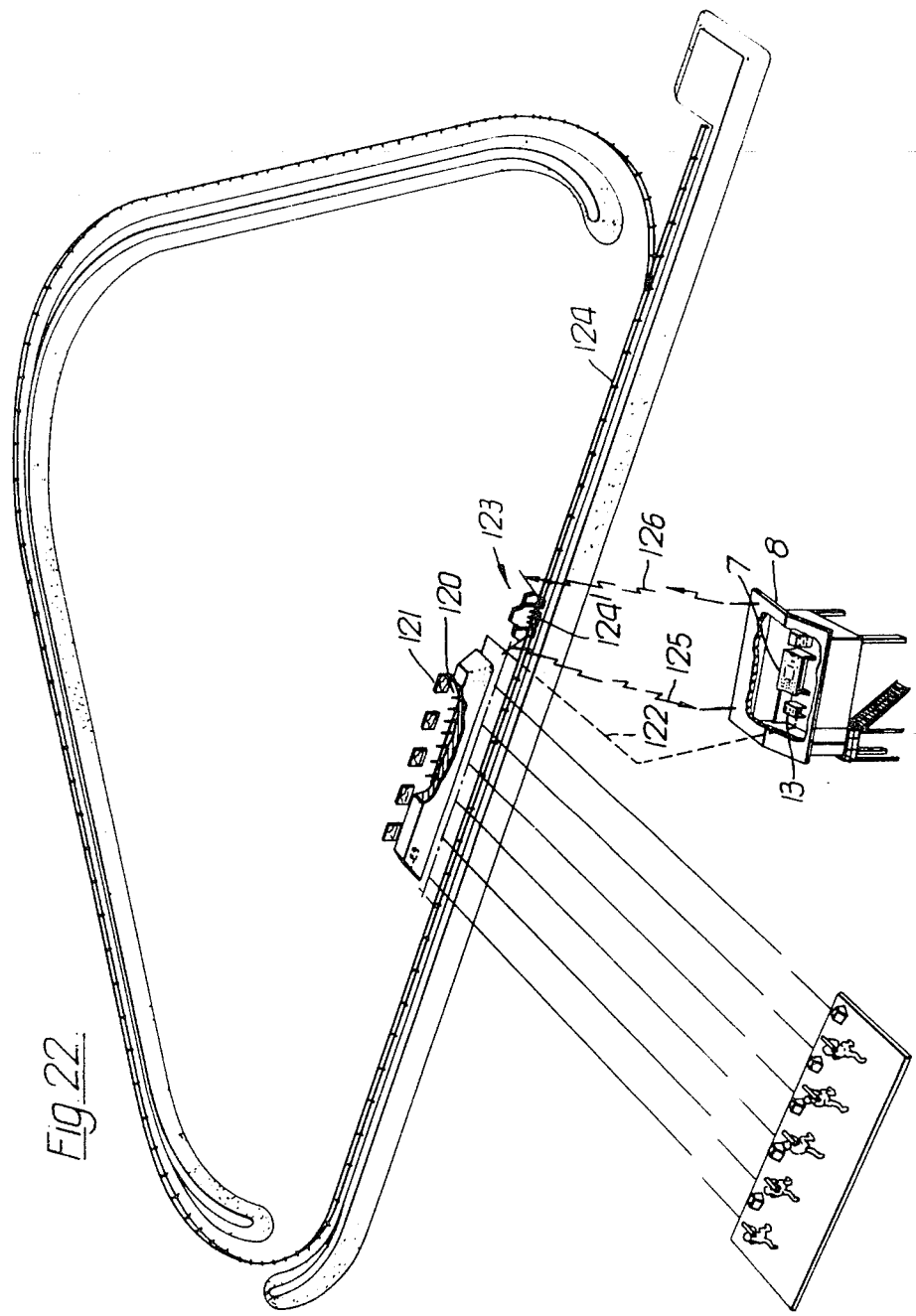
FIG. 22 is a perspective view of another embodiment of a rifle range in accordance with the invention.

FIG. 22 illustrates another embodiment of a range utilising apparatus in accordance with the invention. One set of transducers 120 are located below and in front of a set of static targets 121. These transducers 120 are connected to the computer 7 by a land line 122 as described above. In addition to the static targets 121 there is a radio controlled target carrying self propelled trolley 123 which is movable along a monorail track 124. The trolley 123 carries a target which is a representation of a tank. A set of transducers 124' are mounted on the trolley and signals are set from the transducers 124' to the computer 7 via a radio link 125. A second radio link 126 is provided to enable control signals to be set to the trolley 123. Many other ranges may be designed which utilise the present invention, such ranges having static or trolley mounted targets, targets that can fall automatically when hit and targets that are especially illuminated for night time shooting.

Figure 23:
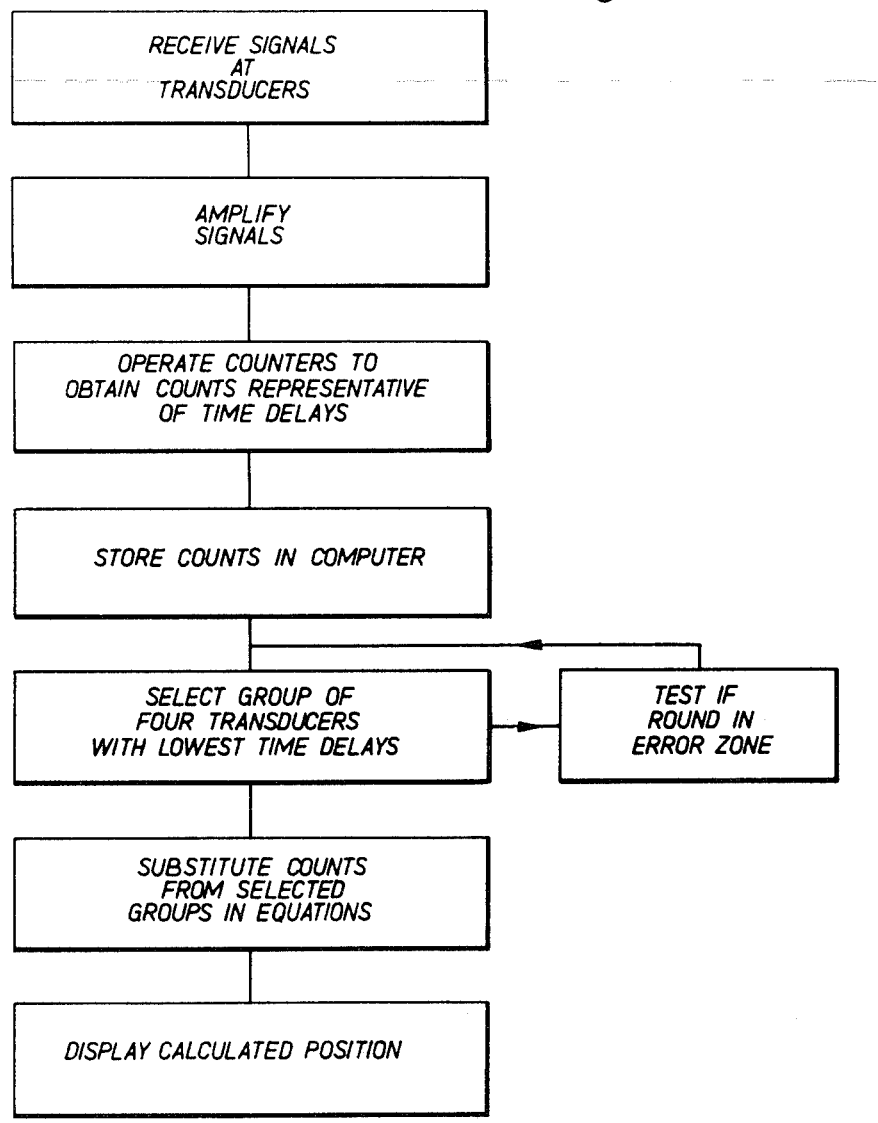
FIG. 23 is a flow diagram of operation of the apparatus illustrated in FIG. 4
Figure 24:
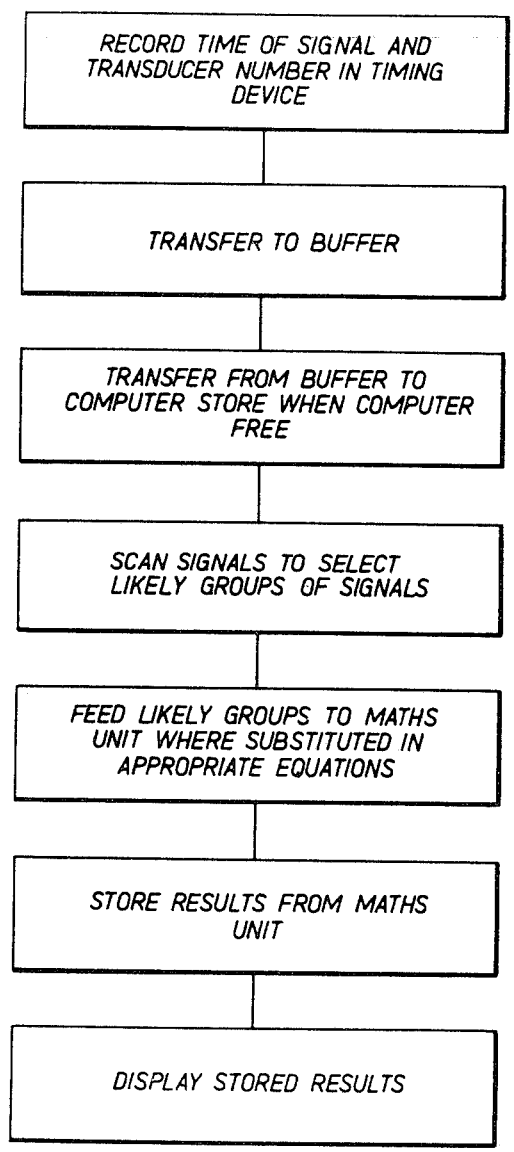
FIG. 24 is a flow diagram of operation of the apparatus illustrated in FIG. 15.

FIGS. 23 and 24 are flow charts of the two computing processes described above, with reference to FIGS. 4 and 15.

It will be understood that those skilled in the art can readily prepare from these flow charts, and from the equations developed above, a special-purpose computing and controlling arrangement for carrying out the described sequence of functions. Those skilled in the art will further recognise that one or more general-purpose computers may be readily programmed to perform such functions without resort to undue experimentation. For this reason, more detailed description of apparatus for these purposes is not deemed necessary here.

It is to be appreciated that in certain embodiments of the invention the transducers may need to be in a three dimensional array, rather than in a single plane.

We claim:

1. Apparatus for determining the location in a predetermined two-dimensional target area adjacent a target member through which the trajectory of a projectile passes, said projectile originating from a firing point and directed toward said target member, the apparatus comprising:
   at least four transducers,
   means for positioning said at least four transducers in a generally horizontal elongate array adjacent an edge of the predetermined target area,
   said transducers positioned spaced apart one from the other at respective predetermined locations,
   each said transducer comprising means for providing an output signal in response to an airborne pressure wave generated by the projectile,
   individual threshold circuit means coupled to each transducer and responsive to said output signal for providing an indication signal when said output signal exceeds a predetermined threshold, the indication signal representing a time at which said airborne pressure wave generated by the projectile impinges on the transducer, and
   processing means, provided with data representing the respective predetermined locations at which the transducers are positioned, and operative for
   (1) determining time differences between the indication signal associated with one of said transducers relative to the indication signal associated with each of the remainder of the transducers,
   (2) calculating, from said determined time differences and from the data representing the respective predetermined transducer locations, the location in said predetermined target area through which said trajectory passes, and
   (2) providing an indication of said calculated location.

2. Apparatus for determining the location in a predetermined two-dimensional target area adjacent a target member through which the trajectory of a projectile passes, said projectile originating from a firing point and directed toward said target member, the apparatus comprising:
   at least three transducers,
   means for positioning said at least three transducers in a generally horizontal elongate array adjacent an edge of the predetermined target area,
   said transducers positioned spaced apart one from the other at respective predetermined locations,
   each said transducer comprising means for providing an output signal in response to an airborne pressure wave generated by the projectile,
   individual threshold circuit means coupled to each transducer and responsive to said output signal for providing an indication signal when said output signal exceeds a predetermined threshold, the indication signal representing a time at which said airborne pressure wave generated by the projectile impinges on the transducer; and
   processing means, provided with data representing the respective predetermined locations at which the transducers are positioned and with data representing the velocity of the projectile and the speed of sound propagation in air, and operative for
   (1) determining time differences between the indication signal associated with one of said transducers relative to the indication signal associated with each of the remainder of the transducers,
   (2) calcuating, from said data representing the respective predetermined transducer locations, said data representing the velocity of the projectile and the speed of sound propagation in air, and said determined time differences, the location in said predetermined target area through which said trajectory passes, and
   (3) providing an indication of said calculated location.

3. Apparatus for determining the location in a predetermined two-dimensional target area adjacent a target member through which the trajectory of a projectile passes, said projectile originating from a firing point and directed toward said target member, the apparatus comprising:
   at least five transducers,
   means for positioning said at least five transducers in a generally horizontal elongate array adjacent an edge of the predetermined target area,
   said transducers positioned spaced apart one from the other at respective predetermined locations,
   each said transducer comprising means for providing an output signal in response to an airborne pressure wave generated by the projectile,
   individual threshold circuit means coupled to each transducer and responsive to said output signal for providing an indication signal when said output signal exceeds a predetermined threshold, the indication signal representing a time at which said airborne pressure wave generated by the projectile impinges on the transducer, and
   processing means, provided with data representing the respective predetermined locations at which the transducers are positioned, and operative for
   (1) determining time differences between the indication signal associated with one of said transducers relative to the indication signal associated with each of the remainder of the transducers,
   (2) comparing the determined time differences with one another and selecting a number of said time differences which will produce at least three independent equations from which the location in said predetermined equations from which the location in said predetermined target area through which said trajectory passes may be calculated, (3) calculating, from said selected three time differences and from the data representing the respective predetermined transducer locations, the location in said predetermined target area through which said trajectory passes, and (4) providing an indication of said calculated location.

4. An apparatus according to claims 1, 2 or 3 wherein said means for providing an indication signal comprises means for receiving and initially amplifying said transducer output signal, and a threshold comparator responsive to the amplified transducer output signal for providing an indication signal only when said amplified signal has an amplitude greater than a predetermined minimum value.

5. An apparatus according to claim 4, wherein said threshold comparator includes adjustable means for setting said predetermined minimum value.

6. An apparatus according to claim 1, 2 or 3, further comprising:
means responsive to said indication signals, for generating and temporarily storing information signals representing times at which said indication signals are provided in response to said output signals, and
means for subsequently transferring said information signals to said processing means.

7. An apparatus according to claim 6, wherein:
said information signal generating said storing means comprises a source of clock signals representing respective instants of time, a latch associated with each transducer and operatively connected for storing an information signal comprising a clock signal from said source representing a time at which an indication signal is provided in response to a transducer output signal, and means for providing a signal identifying each said latch; and
said transferring means comprises a buffer, a control device for authorizing transfer of said information signal from each latch to said buffer along with a corresponding identifying signal, and means for transferring signals from said buffer to said processing means.

8. An apparatus according to claims 1, 2 or 3, wherein said positioning means positions said transducers at points in a three-dimensional array such that the transducers do not lie in a common plane.

9. An apparatus according to claims 1, 2 or 3, wherein said transducers are positioned by said positioning means in a horizontal linear array adjacent an edge of the predetermined target area.

10. An apparatus according to claims 1, 2 or 3, wherein said transducers are positioned by said positioning means between said firing point and said target member.

11. An apparatus according to claims 1, 2 or 3, wherein said transducers are positioned by said positioning means such that said pressure wave impinges directly on the transducers.

12. An apparatus according to claims 1, 2 or 3, further comprising means located between said target member and said transducers for shielding said transducer from acoustic waves generated by impact of said projectile on said target member.

13. An apparatus according to claim 1, further comprising a fifth transducer positioned adjacent said lower edge of the target area and spaced from said at least four transducers, wherein said at least four transducers and said fifth transducer are positioned at respective predetermined locations defining two vertically spaced-apart rows, transducers of one said row being staggered relative to transducers of the other said row such that no transducer lies directly above another transducer.

14. An apparatus according to claims 1, 2 or 3, further including a visual display device responsive to said processing means for providing a visual display of said calculated location.

15. An apparatus according to claims 1, 2 or 3, further comprising:
means for generating a display signal representative of said target member,
means responsive to said display signal for providing a visual representation of said target member, and
means coupled to said display signal generating means, said processing means and said visual display means for modifying said display signal such that said visual representation contains a visual indication of said calculated location.

16. An apparatus according to claim 15, wherein said display signal generating means comprises a television camera, and wherein said display signal is modified by inverting a portion of the display signal.

17. An apparatus according to claim 16, further comprising means for determining x, y coordinates of the point of the visual image being scanned by the television camera at any instant, and means for comparing said x, y coordinates with x, y coordinates representing said calculated location.

18. An apparatus according to claims 1, 2 or 3, further comprising means responsive to said processing means for producing a permanent record of said calculated location.

19. An apparatus according to claims 1, 2 or 3, wherein each said transducer comprises a disc-shaped element of a piezoelectric material having a diameter of approximately 5 mm or less, whereby the output signal of the transducer has an optimally large amplitude in response to an airborne shock wave.

20. An apparatus according to claim 19, wherein each said transducer is mounted such that a flat face of each said disc-shaped member is generally vertical, whereby a pressure wave generated by the projectile will impinge tangentially on a circumferential edge of the disc-shaped member, each point on said circumferential edge being substantially equidistant from a central point of the disc-shaped member such that the output signal of the transducer is substantially independent of the direction of arrival of a pressure wave at said circumferential edge.

21. An apparatus according to claims 1, 2 or 3, wherein each said transducer comprises a piezoelectric element and a solid member of rigid material for transmitting said airborne pressure wave to said piezoelectric element, said member of rigid material having a base in firm contact with said piezoelectric element and having a convex surface exposed to said pressure wave, said exposed convex surface being shaped such that every point thereon is substantially at an equal radial distance from a central point on a surface of said piezoelectric element, whereby the rise time and polarity of said output signal is substantially independent of the direction of arrival of a pressure wave at said exposed convex surface.

22. An apparatus according to claims 1, 2 or 3, wherein said target member is positioned in said predetermined target area.

23. An apparatus according to claims 1, 2 or 3, further comprising means for moving said target member from a concealed position to a visible position and vice-versa.

24. An apparatus according to claims 1, 2 or 3, further comprising a trolley upon which said transducers and said target member are mounted, said trolley being movable along a predetermined track to permit the position of said target member to be adjusted.

25. A method for determining and remotely indicating the location of a source of energy in a defined area, comprising:

positioning at least three energy sensors in a generally horizontal elongate array adjacent an edge of said defined area;

sensing the arrival of airborne energy at said at least three energy sensors;

determining a first time difference between the sensing of said airborne energy at two of said sensors;

determining a second time difference between the sensing of said airborne energy at two of said sensors, at least one of which is other than either of the two sensors used to determine said first time difference;

remotely indicating the location of the energy source by indicator means activated according to said first and second time differences and which indicates the intersections of two families of hyperbolic curves, the foci of the first family of hyperbolic curves corresponding to the locations of the sensors which determined said first time difference, and the foci of the second family of hyperbolic curves corresponding to the locations of the sensors which determined said second time difference.

* * * * *